US012765619B2

(12) United States Patent
Hull et al.

(10) Patent No.: US 12,765,619 B2
(45) Date of Patent: Oct. 20, 2026

(54) METHOD AND APPARATUS FOR CREATING A UNIQUE SURFACE TREATMENT ON A NITRILE GLOVE

(71) Applicant: Summit Glove Inc., Minerva, OH (US)

(72) Inventors: James L. Hull, Malvern, OH (US); Wong Fook Lin, Kuala Lumpur (MY)

(73) Assignee: Summit Glove Inc., Minerva, OH (US)

( * ) Notice: Subject to any disclaimer, the term of this patent is extended or adjusted under 35 U.S.C. 154(b) by 8 days.

(21) Appl. No.: 18/903,167

(22) Filed: Oct. 1, 2024

(65) Prior Publication Data

US 2026/0090592 A1 Apr. 2, 2026

(51) Int. Cl.
*A41D 19/00* (2006.01)
*A41D 19/04* (2006.01)
*B29C 33/00* (2006.01)

(52) U.S. Cl.
CPC ......... *A41D 19/0024* (2013.01); *A41D 19/04* (2013.01); *B29C 33/00* (2013.01)

(58) Field of Classification Search
CPC ..... B29C 39/142; B29C 39/126; B29C 39/10; B29C 39/021; B29C 63/48; B29C 59/00; B29C 53/72; B29C 2043/463; B29C 33/424; B29C 33/00
See application file for complete search history.

(56) References Cited

U.S. PATENT DOCUMENTS

| | | | |
|---|---|---|---|
| 436,206 | A | 9/1890 | Bertheau et al. |
| D169,047 | S | 3/1953 | Sebrell |
| 2,941,277 | A | 6/1960 | Ganz |
| D188,835 | S | 9/1960 | Hoffstein et al. |
| D200,756 | S | 4/1965 | Rowley et al. |
| D202,329 | S | 9/1965 | Swistel |
| D235,175 | S | 5/1975 | Berger |
| 5,715,539 | A | 2/1998 | Benecki et al. |
| 5,794,266 | A | 8/1998 | Han |
| 6,081,928 | A | 7/2000 | Boume |
| 6,591,427 | B1 | 7/2003 | Bennett |
| 6,972,148 | B2 | 12/2005 | Janssen |
| 7,356,852 | B2 | 4/2008 | Thai |
| 7,504,145 | B2 | 3/2009 | Vance et al. |
| 7,514,121 | B2 | 4/2009 | Williams |
| D605,377 | S | 12/2009 | House |

(Continued)

OTHER PUBLICATIONS

International Search Report—PCT/US2025/048572—Nov. 18, 2025.

*Primary Examiner* — Stella K Yi
(74) *Attorney, Agent, or Firm* — Sand, Sebolt & Wernow Co., LPA

(57) ABSTRACT

A method and system for a creating a glove surface treatment on a glove. The method includes steps of applying a former on a forming material, wherein the forming material is non-cured and the former includes a plurality of extensions; creating a first surface treatment on the forming material by the plurality of extensions of the former; applying a mold material on the forming material, wherein the forming material is cured; creating a second surface treatment on the mold material, wherein the second surface treatment is an inverse configuration of the first surface treatment; engaging at least one portion of the mold material having the second surface treatment onto a master mold; creating a caster mold from the master mold that includes the second surface treatment; and creating the glove surface treatment on the glove by the caster mold.

14 Claims, 17 Drawing Sheets

(56) References Cited

U.S. PATENT DOCUMENTS

| | | | |
|---|---|---|---|
| 7,788,737 | B2 | 9/2010 | Baker et al. |
| 9,974,611 | B2 | 5/2018 | Champagne |
| 10,130,438 | B2 | 11/2018 | Champagne |
| D927,792 | S | 8/2021 | Hull et al. |
| D928,416 | S | 8/2021 | Hull et al. |
| 11,969,036 | B2 | 4/2024 | Wong |
| D1,118,094 | S | 3/2026 | Baker |
| 2010/0257656 | A1 | 10/2010 | Hull |
| 2012/0036612 | A1 | 2/2012 | Hull |
| 2013/0273394 | A1 | 10/2013 | Sheu et al. |
| 2014/0208480 | A1 | 7/2014 | Champagne |
| 2014/0259283 | A1 | 9/2014 | Govindasamy et al. |
| 2015/0164159 | A1 | 6/2015 | Hull |
| 2016/0029712 | A1 | 2/2016 | Hull |
| 2016/0309815 | A1 | 10/2016 | Hull |
| 2016/0366959 | A1 | 12/2016 | Hull |
| 2019/0098944 | A1 | 4/2019 | Hull et al. |
| 2019/0388170 | A1 | 12/2019 | Bluecher et al. |
| 2021/0030086 | A1 | 2/2021 | Wong et al. |
| 2023/0382018 | A1 | 11/2023 | Harvey et al. |
| 2024/0000172 | A1 | 1/2024 | Lin |
| 2024/0000174 | A1 | 1/2024 | Hull |
| 2024/0074523 | A1 | 3/2024 | Hull |
| 2026/0090593 | A1 | 4/2026 | Hull |

METHOD AND APPARATUS FOR CREATING A UNIQUE SURFACE TREATMENT ON A NITRILE GLOVE

TECHNICAL FIELD

This disclosure is directed to protective devices used as gloves for a hand that include unique surface treatments.

BACKGROUND ART

Nitrile or nitrile rubber gloves are well known in the art and are used in various industries, including medical and healthcare industries, food service industries, chemical handling industries, and other general uses where such gloves protect person's hands for various intended purposes. In one instance, these types of gloves may act as crucial barriers against pathogens in the medical and healthcare industries when healthcare workers are performing various types of medically-related examinations or procedures. In another instance, these types of gloves also prevent cross-contamination when handling and preparing food to ensure hygiene and safety in the food industries.

However, such common and/or conventional nitrile gloves have disadvantages or problems. Commonly, these nitrile gloves include a smooth or non-textured surface which may limit the gripping or handling capabilities of such gloves when worn by persons in the above-mentioned industries. To address this issue, nitrile or nitrile rubber gloves may be manufactured to define negative textures or negative surface treatments to provide assistance to the wearer in gripping or handling objects when wearing said gloves. In other words, such nitrile or nitrile rubber gloves may be manufactured to define impressions or cavities in the gloves to provide assistance to the wearer in gripping or handling objects when wearing said gloves. However, the negative texturing and/or stippling in such nitrile or nitrile rubber gloves may reduce the amount of space between the surface of the glove and the wearer's hand thus increasing the risk of tearing or ripping of the glove material when performing tasks or procedures. Such risk tearing or ripping of the glove material may, at times, be extremely dangerous if such wearer could come in contact with dangerous external elements that may severely harm or injure said wearer. While increasing the thickness of said gloves could resolve such issues, increasing the overall thickness of these gloves may also reduce the wearer's dexterity and range of motion when wearing said gloves. The lack of dexterity and/or range of motion for wearers in certain industries may hamper productivity and overall feel when handling or gripping various objects or matters.

SUMMARY OF THE INVENTION

The presently disclosed gloves provide handling and gripping benefits over commonly known and used nitrile or nitrile rubber gloves. The presently disclosed gloves define one or more types positive textures or positive surface treatments to increase the handling or gripping capabilities of the gloves without removing the overall thickness of material between the glove itself and the wearer's hand. The presently disclosed gloves also include various widths or diameters of extensions that make up the positive surface treatments to increase the handling or gripping capabilities of the gloves. Such various widths or diameters of extensions may be applied or provided on one or more regions of the gloves depending on the intended use or purpose of the gloves. The presently disclosure also includes a system and a method of manufacturing the gloves to include one or more types positive textures or positive surface treatments for increasing handling or gripping capabilities.

In one aspect, an exemplary embodiment of the present disclosure may provide a method a creating a glove surface treatment on a glove. The method includes steps of: applying a former on a forming material, wherein the forming material is non-cured and the former includes a plurality of extensions; creating a first surface treatment on the forming material by the plurality of extensions of the former; applying a mold material on the forming material, wherein the forming material is cured; creating a second surface treatment on the mold material, wherein the second surface treatment is an inverse configuration of the first surface treatment; engaging at least one portion of the mold material having the second surface treatment onto a master mold; creating a caster mold from the master mold that includes the second surface treatment; and creating the glove surface treatment on the glove by the caster mold.

This exemplary embodiment or another exemplary embodiment may further include that each extension of the plurality of extensions defines a curvilinear shape. This exemplary embodiment or another exemplary embodiment may further include that each extension of the plurality of extensions is a ball bearing. This exemplary embodiment or another exemplary embodiment may further include that the step of creating the first surface treatment on the forming material further includes that the first surface treatment is a negative surface; and wherein the step of creating the second surface treatment on the mold material further includes that the second surface treatment is a positive surface. This exemplary embodiment or another exemplary embodiment may further include that the step of creating the first surface treatment on the forming material further includes that the first surface treatment is a plurality of concave surfaces; and wherein the step of creating the second surface treatment on the mold material further includes that the second surface treatment is a plurality of convex surfaces. This exemplary embodiment or another exemplary embodiment may further include that the step of creating the first surface treatment on the forming material further comprises: applying a first group of extensions of the plurality of extensions on the forming material, wherein each extension of the first group of extensions defines a first diameter; applying a second group of extensions of the plurality of extensions on the forming material, wherein each extension of the second group of extensions defines a second diameter that is greater than the first diameter of each extension of the first group of extensions. This exemplary embodiment or another exemplary embodiment may further include that the step of applying the first group of extensions of the plurality of extensions on the forming material further includes that the first diameter of each extension of the first group of extensions is between 0.7 mm to 0.8 mm; and wherein the step of applying the second group of extensions of the plurality of extensions on the forming material further includes that the second diameter of each extension of the second group of extensions is between 1.0 mm to 1.2 mm. This exemplary embodiment or another exemplary embodiment may further include that the step of creating the first surface treatment on the forming material further comprises: applying a first group of extensions of the plurality of extensions on the forming material, wherein each extension of the first group of extensions defines a first diameter; applying a second group of extensions of the plurality of extensions on the forming material, wherein each extension of the second group of extensions defines a second diameter that is greater than the first diameter of each extension of the first group of extensions; and applying a third group of extensions of the plurality of extensions on the forming material, wherein ach extension of the third group of extensions defines a third diameter that is greater than the second diameter of each extension of the second group of extensions. This exemplary embodiment or another exemplary embodiment may further include that the step of applying the first group of extensions of the plurality of extensions on the forming material further includes that the first diameter of each extension of the first group of extensions is between 0.7 mm to 0.8 mm; wherein the step of applying the second group of extensions of the plurality of extensions on the forming material further includes that the second diameter of each extension of the second group of extensions is between 1.0 mm to 1.2 mm; and wherein the step of applying the third group of extensions of the plurality of extensions on the forming material further includes that the third diameter of each extension of the third group of extensions is between 1.3 mm to 1.4 mm. This exemplary embodiment or another exemplary embodiment may further include that the step of engaging the at least one portion of the mold material having the second surface treatment further comprises: engaging the at least one portion of the mold material having the second surface treatment to a palm of the master mold. This exemplary embodiment or another exemplary embodiment may further include that the step of engaging the at least one portion of the mold material having the second surface treatment further comprises: engaging the at least one portion of the mold material having the second surface treatment to at least one digit of the master mold. This exemplary embodiment or another exemplary embodiment may further include that the step of engaging the at least one portion of the mold material having the second surface treatment further comprises: engaging a first portion of the mold material having the second surface treatment to a palm of the master mold; and engaging a second portion of the mold material having the second surface treatment to at least one digit of the master mold. This exemplary embodiment or another exemplary embodiment may further include that the glove surface treatment includes a first plurality of projections where each projection of the first plurality of projection defines a first diameter; and wherein the glove surface treatment includes a second plurality of projections where each projection of the second plurality of projections defines a second diameter that is equal to the first diameter. This exemplary embodiment or another exemplary embodiment may further include that the glove surface treatment includes a first plurality of projections where each projection of the first plurality of projection defines a first diameter; wherein the glove surface treatment includes a second plurality of projections where each projection of the second plurality of projections defines a second diameter that is one of greater than or less than the first diameter.

In another aspect, an exemplary embodiment of the present disclosure may provide a system for manufacturing a glove. The system includes a pattern plate configured to receive a forming material; a former operably engageable with the pattern plate and adapted to create a surface treatment on the forming material; and a master mold adapted to operably engage with a mold material that includes the surface treatment applied by the forming material, wherein the surface treatment of the mold material defines an inverse pattern of the surface treatment of the forming material.

This exemplary embodiment or another exemplary embodiment may further include that the former comprises: a set of ball bearings to form the surface treatment into the forming material. This exemplary embodiment or another exemplary embodiment may further include that the former further comprises: a first group of ball bearings of the set of ball bearings, wherein each ball bearing of the first group of ball bearings defines a first diameter; and a second group of ball bearings of the set of ball bearings, wherein each ball bearing of the second group of ball bearings defines a second diameter that is greater than the first diameter. This exemplary embodiment or another exemplary embodiment may further include that the first diameter of each ball bearing of the first group of ball bearings is measured between 0.7 mm to 0.8 mm; and wherein the second diameter of each ball bearing of the second group of ball bearings is measured between 1.0 mm to 1.2 mm. This exemplary embodiment or another exemplary embodiment may further include that the former further comprises: a first group of ball bearings of the set of ball bearings, wherein each ball bearing of the first group of ball bearings defines a first diameter; a second group of ball bearings of the set of ball bearings, wherein each ball bearing of the second group of ball bearings defines a second diameter that is greater than the first diameter; and a third group of ball bearings of the set of ball bearings, wherein each ball bearing of the third group of ball bearings defines a third diameter that is greater than the second diameter. This exemplary embodiment or another exemplary embodiment may further include that the first diameter of each ball bearing of the first group of ball bearings is measured between 0.7 mm to 0.8 mm; wherein the second diameter of each ball bearing of the second group of ball bearings is measured between 1.0 mm to 1.2 mm; and wherein the third diameter of each ball bearing of the third group of ball bearings is measured between 1.3 mm to 1.4 mm.

In yet another aspect, an exemplary embodiment of the present disclosure may provide a glove. The glove includes a wrist region; a palm region extending outwardly from the wrist region and defining a palm plane; at least one digit region extending outwardly from the palm region and terminating at a terminal end, wherein a longitudinal axis of the at least one digit region extends between the terminal end and the palm region and is parallel to the palm plane; and a surface treatment provided on the palm region or the at least one digit region, the surface treatment having a set of projections that extends outwardly from the palm region or the at least one digit region.

This exemplary embodiment or another exemplary embodiment may further include that each projection of the set of projections extends outwardly along an axis that is non-parallel to the palm plane of the palm region. This exemplary embodiment or another exemplary embodiment may further include that each projection of the set of projections extends outwardly along an axis that is non-parallel to the longitudinal axis of the at least one digit region. This exemplary embodiment or another exemplary embodiment may further include that each projection of the set of projections further comprises: a base operably engaged with the palm region or the at least one digit region; and a tip extending outwardly from the base and spaced apart from the palm region or the at least one digit region. This exemplary embodiment or another exemplary embodiment may further include a recess defined between at least two projections of the set of projections; wherein the glove is adapted to receive an object inside of the recess while said objects contacts one or both of the at least two projections and the base inside of the recess. This exemplary embodiment or another exemplary embodiment may further include that each projection of the set of projections defines the same diameter. This exemplary embodiment or another exemplary embodiment may further include a first group of projections of the set of projections, wherein each projection of the first group of projections defines a first diameter; and a second group of projections of the set of projections, wherein each projection of the second group of projections defines a second diameter that is greater than the first diameter. This exemplary embodiment or another exemplary embodiment may further include that an arrangement between the first group of projections and the second group of projections is uniform or randomized. This exemplary embodiment or another exemplary embodiment may further include that the first diameter of each projection of the first group of projections is between 0.7 mm to 0.8 mm; and wherein the second diameter of each projection of the second group of projections is between 1.0 mm to 1.2 mm. This exemplary embodiment or another exemplary embodiment may further include a first group of projections of the set of projections, wherein each projection of the first group of projections defines a first diameter; a second group of projections of the set of projections, wherein each projection of the second group of projections defines a second diameter that is greater than the first diameter; and a third group of projections of the set of projections, wherein each projection of the third group of projections defines a third diameter that is greater than the second diameter. This exemplary embodiment or another exemplary embodiment may further include an arrangement among the first group of projections, the second group of projections, and the third group of projections is uniform or randomized. This exemplary embodiment or another exemplary embodiment may further include that the first diameter of each projection of the first group of projections is between 0.7 mm to 0.8 mm; wherein the second diameter of each projection of the second group of projections is between 1.0 mm to 1.2 mm; and wherein the third diameter of each projection of the third group of projections is between 1.3 mm to 1.4 mm. This exemplary embodiment or another exemplary embodiment may further include an inner surface defined along the palm region and the at least one digit region and having the surface treatment; and an outer surface defined along the palm region and the at least one digit region and being opposite to the inner surface and being free from having the surface treatment. This exemplary embodiment or another exemplary embodiment may further include that an inner surface defined along the palm region and the at least one digit region and having the surface treatment; and an outer surface defined along the palm region and the at least one digit region and being opposite to the inner surface and having the surface treatment. This exemplary embodiment or another exemplary embodiment may further include that the surface treatment is provided on one of an index finger region, a middle finger region, a ring finger region, and a little finger region of the at least one digit region and provided on a thumb region of the at least one digit region. This exemplary embodiment or another exemplary embodiment may further include that the surface treatment is provided on an index finger region, a middle finger region, a ring finger region, and a little finger region of the at least one digit region and provided on a thumb region of the at least one digit region. This exemplary embodiment or another exemplary embodiment may further include at least one surface treatment gap defined between the palm region and the at least one digit region. This exemplary embodiment or another exemplary embodiment may further include that the at least one surface treatment gap further comprises: a first surface treatment gap defined between the palm region and a thumb region of the at least one digit region. This exemplary embodiment or another exemplary embodiment may further include that the at least one surface treatment gap further comprises: a second surface treatment gap defined between the palm region and one or more of an index finger region, a middle finger region, a ring finger region, and a little finger region of the at least one digit region.

In yet another aspect, an exemplary embodiment of the present disclosure may provide a glove. The glove includes a wrist region; a palm region extending outwardly from the wrist region and defining a palm plane; at least one digit region extending outwardly from the palm region and terminating at a terminal end, wherein a longitudinal axis of the at least one digit region extends between the terminal end and the palm region and is parallel to the palm plane; and a surface treatment provided on the palm region and the at least one digit region, the surface treatment having a set of projections that extends outwardly from the palm region and the at least one digit region.

BRIEF DESCRIPTION OF THE DRAWINGS

One or more exemplary embodiment(s) of the present disclosure is set forth in the following description, is shown in the drawings and is particularly and distinctly pointed out and set forth in the appended claims. The accompanying drawings, which are incorporated in and constitute a part of the specification, illustrate various example configurations and methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
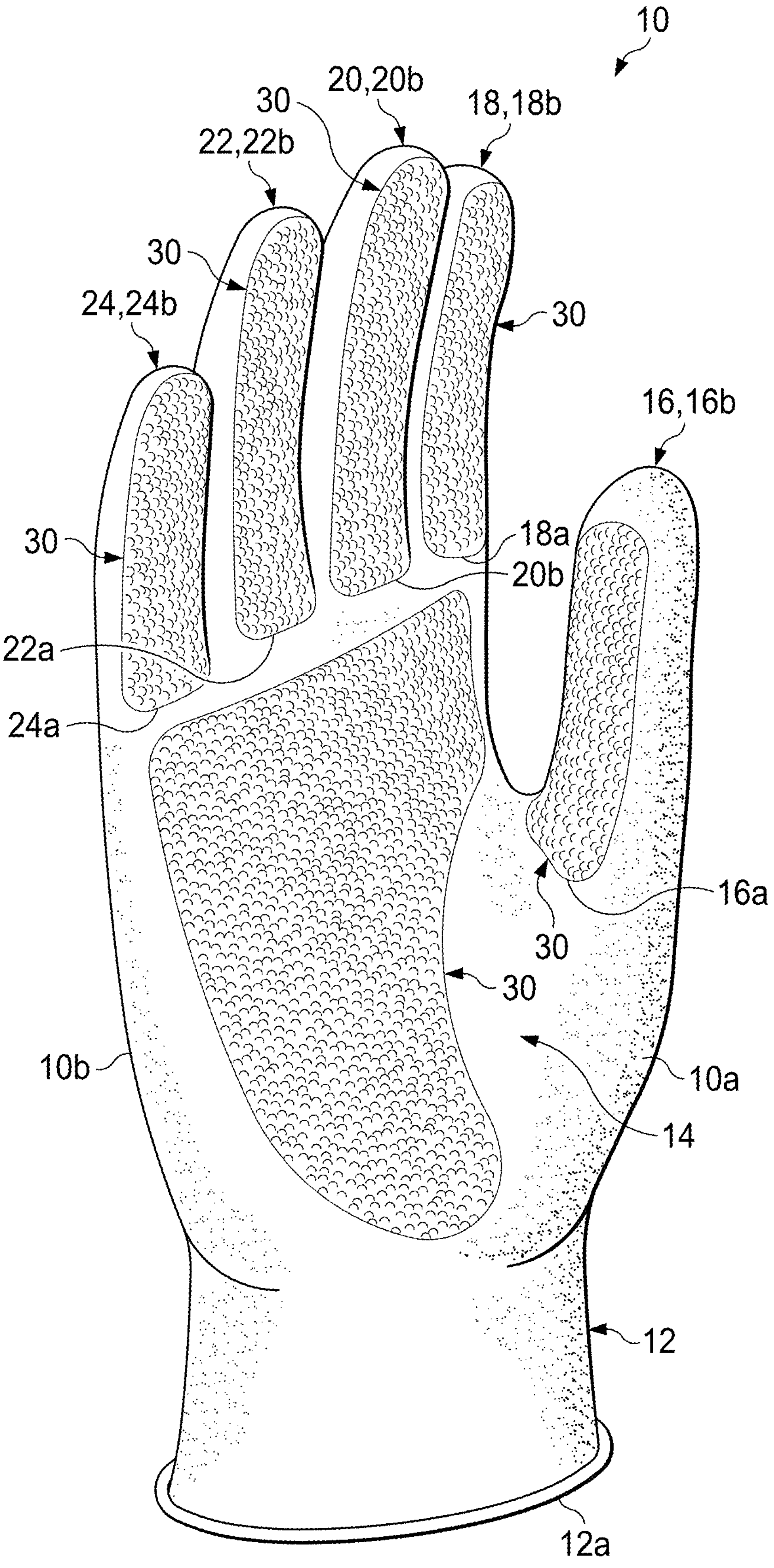
FIG. 1 is a perspective view of a first embodiment of a glove in accordance with the present disclosure.
Figure 2:
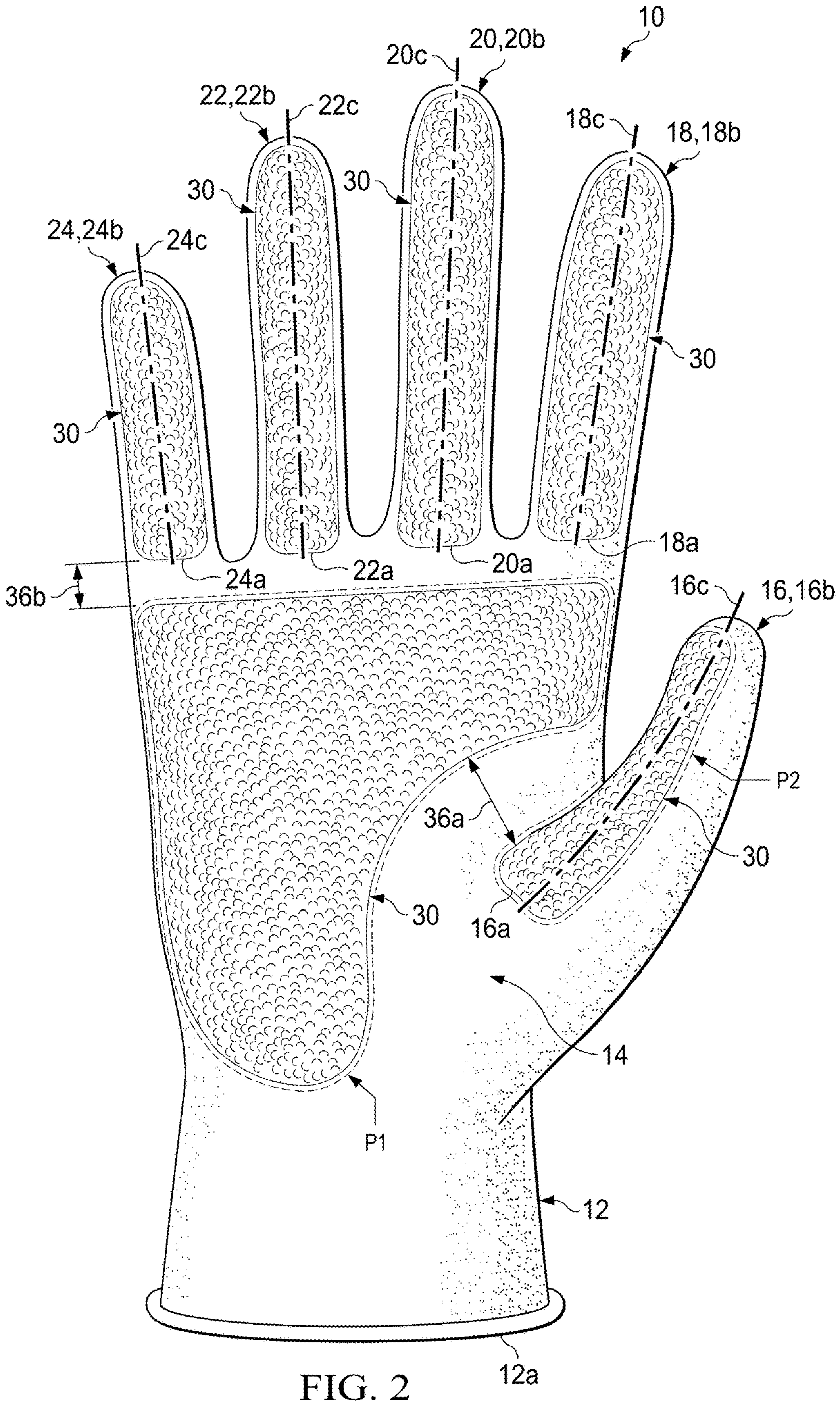
FIG. 2 is a front elevation view of the glove shown in FIG. 1.
Figure 3:
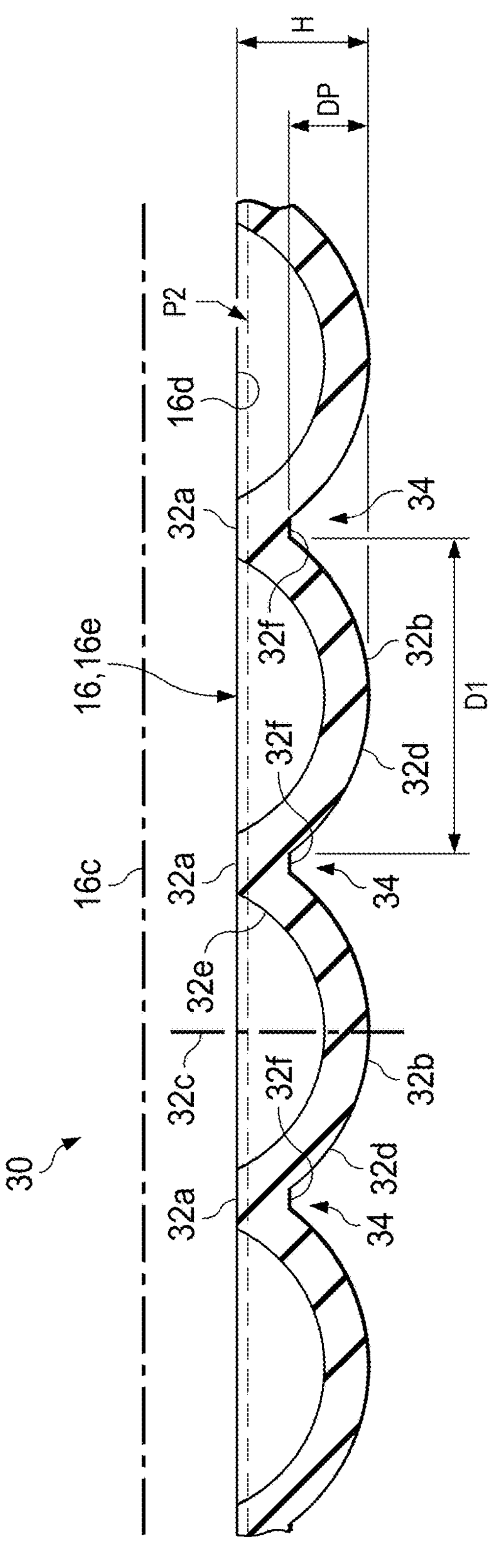
FIG. 3 is a partial sectional view of the glove shown in FIG. 1.

FIGS. 1-3 illustrates a first embodiment of a glove in accordance with one aspect of the present disclosure, generally indicated as 10 herein. As shown in FIG. 1, glove 10 generally includes a first or inner surface 10*a* and a second or outer surface 10*b* that is opposite to the first surface 10*a*. It should be noted that glove 10 may be an ambidextrous glove which is capable of being worn on either of a left hand or a right hand of the person. In the present disclosure, glove 10 is shown to be worn on a person's right hand where the inner surface 10*a* of glove 10 is located on the palm or forehand of the wearer's hand, and outer surface 10*b* of glove 10 is located on the backhand of the wearer's hand. Other exemplary embodiments of how glove 10 may be worn are discussed in greater detail below.

As shown in FIGS. 1-2, glove 10 includes a wrist region 12 that has a cuff or wrist end 12*a*. Wrist region 12 is the portion of glove 10 which will cover the person's wrist and, in some embodiments, part of the forearm of the person when glove 10 is worn. The degree to which the wrist and forearm of the person are covered by wrist region 12 is dependent upon the length of the wrist region 12 as measured from a palm region of the glove 10 through to the cuff or rolled rim 12*a* at a lowermost edge of glove 10. A longer length wrist region 12 will cover the wrist and at least part of the forearm of the person wearing the glove. A shorter length wrist region 12 may only just cover the person's wrist. The length of the wrist region 12 will be varied according to the intended final use of glove 10. Consequently, it should be understood that the particular length wrist region 12 shown in the attached figures is exemplary only and shorter or longer wrist regions 12 may be provided on other embodiments of the glove 10.

Still referring to FIGS. 1-2, glove 10 also includes a palm region 14 that extends outwardly from the wrist region 12. In the present disclosure, palm region 14 is configured to receive the person's palm therein when glove 10 is worn. The palm region 14 includes a first surface (that is in communication with the inner surface 10*a*) which will be located adjacent those regions of a person's palm which will contact an object when gripped in the person's hand. The palm region 14 further includes a second surface (that is in communication with the outer surface 10*b*) which will be located adjacent the back of the person's hand. The term "palm region" 14 as used herein is therefore contemplated to encompass both of the first and second surface which will be located adjacent the front and back of the person's hands. Glove 10 also includes two opposed sides of glove 10 which extend between the first and second surface of the palm region 14.

Palm region 14 as illustrated in FIGS. 1-2 also includes a palm plane P1 (see FIG. 2). The palm plane P1 extends along the first surface of the palm region 14 in which the palm plane P1 is parallel to the inner surface 10*a* of the glove 10. During use, a person wearing the glove 10 may break the palm plane P1 when the person grips or grasps an object. While not illustrated herein, it should be understood that palm region 14 also includes another plane that extends along the second surface of the palm region 14 in which this plane is parallel to the outer surface 10*b* of the glove 10; as such, this exemplary plane is parallel to the palm plane P1 shown in FIG. 2. It should be noted that plane may be broken when the person is wearing said glove 10 on the left hand and grips or grasps an object.

Glove 10 also includes at least one set of digit regions that extends outwardly from the palm region 14. As best seen in FIGS. 1-3, glove 10 includes a plurality of digit regions that includes a first digit region or a thumb region 16, a second digit region or pointer finger region 18, a third digit region or middle finger region 20, a fourth digit region or ring finger region 22, and a fifth digit region or little finger region 24 that extend outwardly from the palm region 14. Thumb region 16, pointer finger region 18, middle finger region 20, ring finger region 22, and little finger region 24 are configured to receive an associated one of a thumb, an index finger, a middle finger, a ring finger, and a little finger of the person's hand, respectively.

With respect to thumb region 16, and as best seen in FIGS. 1-2, thumb region 16 includes a base or proximal end 16*a* that operably engages with the palm region 14. Thumb region 16 also includes a tip or terminal end 16*b* that is opposite to the base 16*a* and is spaced apart from the palm region 16. Thumb region 16 also includes a longitudinal axis or digit axis 16*c* that extends between the base 16*a* and the tip 16*b* (see FIGS. 2 and 3). Thumb region 16 also includes an exterior wall 16*d* that extends circumferentially between the base 16*a* and the tip 16*b* and is in communication with the exterior environment surrounding the glove 10. Thumb region 16 also includes an interior wall 16*e* that extends circumferentially between the base 16*a* and the tip 16*b* and is free from being in communication with the exterior environment surrounding the glove 10. The interior wall 16*e* is configured to engage with a person's thumb when the person's hand is positioned inside of the glove 10.

Similar to the thumb region 16, the pointer finger region 18 is substantially similar to thumb region 16 except for receiving a person's pointer finger instead of a person's thumb. As such, the pointer finger region 18 includes a base or proximal end 18*a*, a tip or distal end 18*b*, a longitudinal axis 18*c*, an exterior wall 18*d*, and an interior wall 18*e* that are substantially similar to the base 16*a*, the tip 16*b*, the longitudinal axis 16*c*, the exterior wall 16*d*, and the interior wall 16*e* of thumb region 16. Additionally, the middle finger region 20 is substantially similar to thumb region 16 except for receiving a person's middle finger instead of a person's thumb. As such, the middle finger region 20 includes a base or proximal end 20*a*, a tip or distal end 20*b*, a longitudinal axis 20*c*, an exterior wall 20*d*, and an interior wall 20*e* that are substantially similar to the base 16*a*, the tip 16*b*, the longitudinal axis 16*c*, the exterior wall 16*d*, and the interior wall 16*e* of thumb region 16. Further, the ring finger region 22 is substantially similar to thumb region 16 except for receiving a person's ring finger instead of a person's thumb. As such, the ring finger region 22 includes a base or proximal end 22*a*, a tip or distal end 22*b*, a longitudinal axis 22*c*, an exterior wall 22*d*, and an interior wall 22*e* that are substantially similar to the base 16*a*, the tip 16*b*, the longitudinal axis 16*c*, the exterior wall 16*d*, and the interior wall 16*e* of thumb region 16. Lastly, the little finger region 24 is substantially similar to thumb region 16 except for receiving a person's little finger instead of a person's thumb. As such, the little finger region 24 includes a base or proximal end 24*a*, a tip or distal end 24*b*, a longitudinal axis 24*c*, an exterior wall 24*d*, and an interior wall 24*e* that are substantially similar to the base 16*a*, the tip 16*b*, the longitudinal axis 16*c*, the exterior wall 16*d*, and the interior wall 16*e* of thumb region 16.

Each digit region of glove 10 as illustrated in FIGS. 1-2 also includes a digit plane P2. For brevity, the digit plane P2 is shown on the thumb region 16 in FIG. 3; the remaining digit regions 18, 20, 22, 24 also include digit planes D2. The digit plane P2 extends along the exterior surface 16 of the thumb region 16 in which the digit plane P2 is parallel to the inner surface 10*a* of the glove 10. During use, a person wearing the glove 10 may break the digit plane P2 when the person grips or grasps an object with the thumb region 16. While not illustrated herein, it should be understood that thumb region 16 (along with the remaining digit regions 18, 20, 22, 24) also includes another plane that extends along the second surface of the palm region 14 in which this plane is parallel to the outer surface 10*b* of the glove 10; as such, this exemplary plane is parallel to the digit plane P2 shown in FIG. 3. It should be noted that plane may be broken when the person is wearing said glove 10 on the left hand and grips or grasps an object.

Glove 10 also includes at least one surface treatment or gripping section 30 that is provided on the palm region 14 and/or on one or more digit regions of the plurality of digit regions discussed herein (see FIGS. 1-3. In the present disclosure, a plurality of surface treatments 30 are provided on the palm region 14, the thumb region 16, the pointer finger region 18, the middle finger region 20, the ring finger region 22, and the little finger region 24. For brevity, a single surface treatment of the plurality of surface treatments 30 provided on one of the digit regions will be discussed below. It should be understood that such discussion and explanation of this single surface treatment of the plurality of surface treatments 30 applies equally to all remaining surface treatments of the plurality of surface treatments 30 provided on the palm region 14 and the remaining digit regions of the plurality of digit regions.

As best seen in FIG. 3, surface treatment 30 includes a plurality of projections 32 that extends outwardly from the palm region 14 and/or from a respective digit region of the plurality of digit regions. Each projection of the plurality of projections 32 includes a base 32*a* that operably engages with an exterior wall 16*d*, 18*d*, 20*d*, 22*d*, 24*d* of a respective digit region 16, 18, 20, 22, 24, a tip or point 32*b* that is opposite to the base 32*a* and is spaced apart from the respective digit region, and a longitudinal axis or projection axis 32*c* that extends between the base 32*a* and the tip 32*b*. In the present disclosure, the longitudinal axis 32*c* of the respective projection 32 is non-parallel to or orthogonal to the longitudinal axis (e.g., longitudinal axis 16*c*) of the respective digit region. It should be noted that each projection of the plurality of projections 32 is also non-parallel to or orthogonal to the plane P1 of palm region 14 with respect to the surface treatment 30 provided on the palm region 14.

Still referring to the plurality of projections 32, each projection of the plurality of projections 32 also includes an exterior surface 32*d* that extends circumferentially between the base 32*a* and the tip 32*b* and is in communication with the exterior environment surrounding the glove 10. Each projection of the plurality of projections 32 also includes an interior wall 32*e* that extends between each base 32*a* and is free from being in communication with the exterior environment surrounding the glove 10. In the present disclosure, the interior wall 32*e* of each projection of the plurality of projections 32 operably engages with the exterior wall of the corresponding digit region. In one exemplary embodiment, the interior wall 32*e* of each projection of the plurality of projections 32 may also be formed with the interior wall 16*e* of the respective digit region such that the interior wall 32*e* comes in contact with the person's digit or finger.

Surface treatment 30 also defines a plurality of recesses or valleys 34. Particularly, and as best seen in FIG. 3, each recess of the plurality of recesses 34 is defined between a pair of adjacent projections of the plurality of projections 32 from the tips 32*b* of the adjacent projections 32 to an inner base wall 32*f* that connects the adjacent projections 32 with one another. As such, adjacent projections of the plurality of projections 32 are separated and/or spaced apart from one another by a recess of the plurality of recesses 34 while still being joined and/or connected to one another by the inner base wall 32*f*. With such structural configuration of the surface treatment 30, the projections of the plurality of projections 32 are continuously connected with one another along the length of the digit region. Additionally, each recess of the plurality of recesses 32 is defined by a depth measured between the tips 32*b* of adjacent projections 32 and an inner base wall 32*f* connecting the adjacent projections 32; such depth is denoted by double arrows labeled "DP" in FIG. 3. In the present disclosure, the depth "DP" of each recess of the plurality of recesses 34 is less than an overall height of each projection of the plurality of projections 32, which is discussed in greater detail below.

Figure 10:
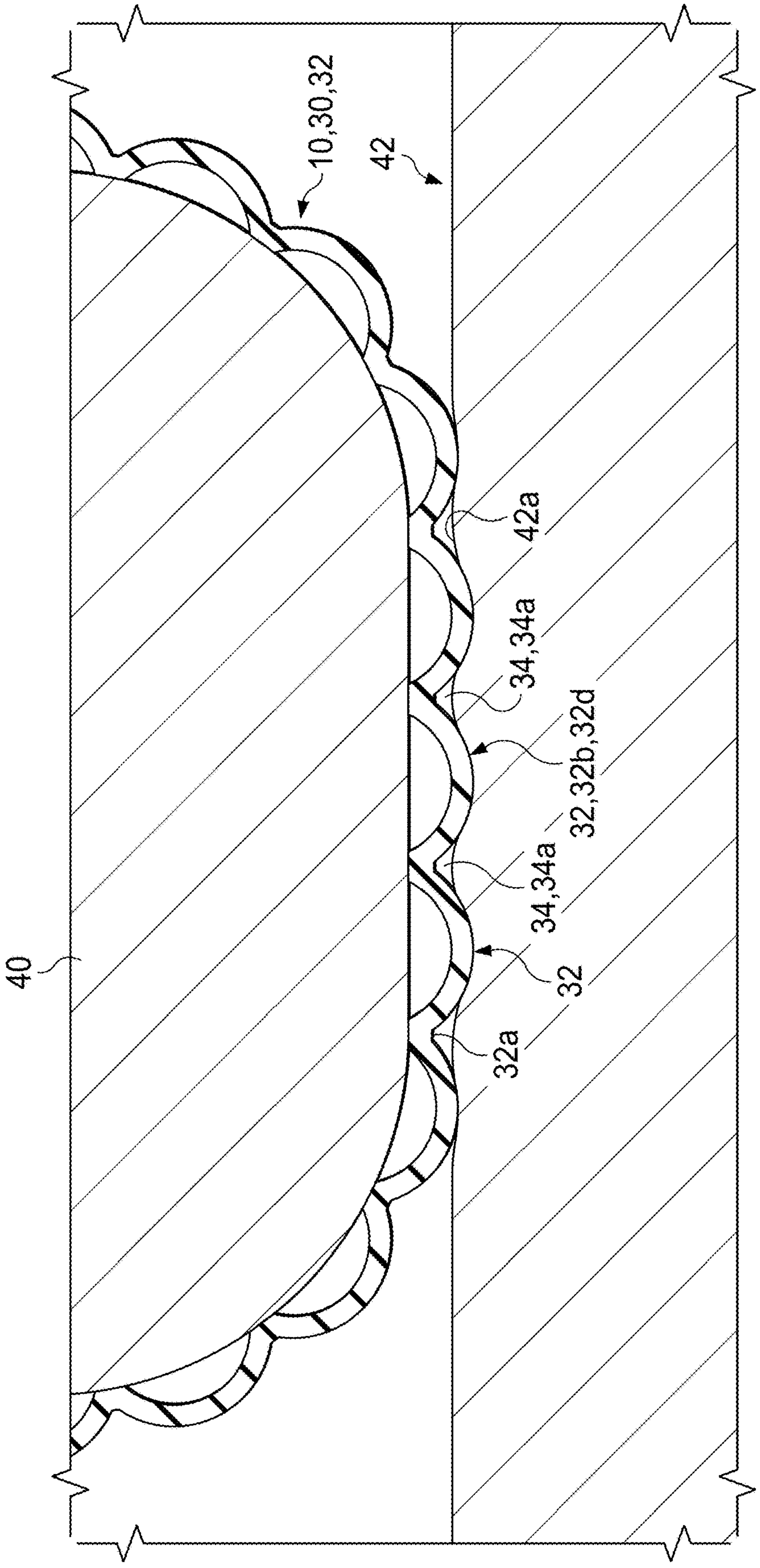
FIG. 10 is an operational view of the glove, shown in FIG. 1, being worn and engaging with an object.

In operation, a portion of an object that is gripped by a person or wearer 40 wearing glove 10 may be received and housed inside one or more recesses of the plurality of recesses 34. As best seen in FIG. 10, portions of object 42 may be housed inside of a group of recesses 34*a* of the plurality of recesses 34. It should be noted that a group of projections of the set of projections 32 may also engage with and contact object 42 inside of a respective recess of the plurality of recesses 34 and/or outside of the respective recess of the plurality of recesses 34. Such structural configuration of the surface treatment 30 is considered advantageous at least because the glove 10 enables a person to grip an object (like object 42) at multiple locations along the surface treatment 30 while not sacrificing or omitting contact space along the glove 10 and material between the glove 10 and the wearer's hand.

Surface treatment 30 also defines one or more gaps between the palm region 14 and one or more digit regions of the plurality of digit regions 16, 18, 20, 22, 24. As best seen in FIGS. 1-2, a first gap 36*a* may be defined along the inner surface 10*a* of glove 10 between the palm region 14 and thumb region 16. As such, the first gap 36*a* is free from any surface treatment 30 that is provided on the palm region 14 and the thumb region 16. Similarly, and as best seen in FIGS. 1-2, a second gap 36*b* may be defined along the inner surface 10*a* of glove 10 between the palm region 14 and remaining digit regions (i.e., the pointer finger region 18, the middle finger region 20, the ring finger region 22, and the little finger region 24). As such, the second gap 36*b* is free from any surface treatment 30 that is provided on the palm region 14 and the remaining digit regions. Such gaps 36*a*, 36*b* defined along the glove 10 are considered advantageous at least because such omission of surface treatment 30 may increase dexterity and movement of the person's hand when wearing the glove 10. Stated differently, the omission of surface treatment 30 at gaps 36*a*, 36*b* allows the person to have a full range of motion when grasping or gripping an object when wearing said glove 10.

While glove 10 is shown having gaps 36*a*, 36*b*, other exemplary embodiments of glove 10 having different surface treatment 30 layouts and/or design may be contemplated herein. In one exemplary embodiment, a glove may have a continuous surface treatment (e.g., surface treatment 30) extending from a palm region of the glove to one or more digit regions of a plurality of digit regions of the glove. In this embodiment, the surface treatment may be continuous and uninterrupted from the palm region of the glove to one or more digit regions of a plurality of digit regions of the glove. In another exemplary embodiment, a glove may have a continuous surface treatment (e.g., surface treatment 30) extending from a palm region of the glove to one or more digit regions of a plurality of digit regions of the glove where a portion of the surface treatment is less dense and/or less pronounce in the areas defined between the palm region and the digit regions (i.e., the gaps 36*a*, 36*b*) to promote dexterity and range of motion. In this embodiment, the surface treatment may still be continuous and uninterrupted from the palm region of the glove to one or more digit regions of a plurality of digit regions of the glove.

Glove 10 as illustrated in FIGS. 1-3 is an ambidextrous glove which is capable of being worn on either of a left hand or a right hand of the person. In the ambidextrous glove 10, each of the thumb region 16, index finger region 18, middle finger region 20, ring finger region 22, and little finger region 24 are aligned along a common plane (not numbered).

When glove 10 is worn on the right hand as illustrated in FIGS. 1-2, the surface of the glove 10 facing the viewer is considered, for the purposes of this description, to be the "front" surface or inner surface 10*a* of the glove 10. The front of the glove is that part of the glove which will contact an object held in a right hand of a person while wearing the glove. Because FIG. 1 shows a "front" view, the surfaces of the wrist region 12, palm region 14, and digit regions facing the viewer of FIG. 1 may be considered to be the "front" surface of the respective one of the wrist region 12, palm region 14, and digit regions 16, 18, 20, 22, and 24. FIG. 1 also shows a "back" surface or outer surface 10*b* of the glove 10 that faces away from the viewer. Consequently, the surface of the wrist region 12, palm region 14, and digit regions facing towards the viewer in FIGS. 1-2 may be considered to be the "back" surface of each of the wrist region 12, palm region 14, and digit regions 16, 18, 20, 22, and 24, for the purposes of this description. Furthermore, it will be understood that the sides of the wrist region 12, palm region 14, and digit regions 16, 18, 20, 22, and 24 extending between the front and back of the glove 10 will be considered to be either a left side (first side) or right side (second side) of the respective component parts of the glove 10 for the purposes of this description. For example, FIG. 1 shows the right side (second side) of the various component parts of glove 10.

It should be noted that the terms "front", "back", "left", and "right" are used for ease of description and particularly describe the specific orientation of the glove 10 illustrated in FIGS. 1 through 3. The terms "front", "back", "left", and "right" should therefore not be narrowly construed to necessarily describe the orientation of the glove 10 during use, particularly since glove 10 is an ambidextrous glove and can be worn on either of the left hand or right hand of a user.

With such ambidextrous capabilities, such surface treatment 30 discussed herein may be applied to one or more areas of the glove 10 as contemplated in other exemplary embodiment. In one exemplary embodiment, surface treatment 30 may be applied to the inner surface 10*a* of the glove 10 and to the outer surface 10*b* of the glove 10 to promote use of the glove 10 on the right hand of a person or the left hand of the person. In another exemplary embodiment, surface treatment 30 may be applied to only to the outer surface 10*b* of the glove 10 to promote use of the glove 10 on the left hand of the person only if desired for intended purpose.

Referring back to the plurality of projections 32 of surface treatment 30, each projection of the plurality of projections 32 defines a curvilinear or rounded shape when viewed from a longitudinal section view (see FIG. 3). Such curvilinear or rounded shape of each projection of the plurality of projections 32 is caused by a former having at least one plurality of extensions defining a curvilinear or rounded shape, which is discussed in greater detail below. In other exemplary embodiment, any projection of the plurality of projections discussed herein may take the form of any shape. Thus, it is to be understood that any other geometric configuration of that element, component, or structure is entirely possible. For example, instead of each projection of the plurality of projections 32 defining a curvilinear or rounded shape, each projection of the plurality of projections 32 may be semi-circular triangular, rectangular or square, pentagonal, hexagonal, heptagonal, octagonal, decagonal, dodecagonal, diamond shaped or another parallelogram, trapezoidal, star-shaped, oval, ovoid, lines or lined, teardrop-shaped, cross-shaped, donut-shaped, heart-shaped, arrow-shaped, crescent-shaped, or any other type of regular or irregular, symmetrical or asymmetrical configuration.

Still referring to the plurality of projections 32, each projection of the plurality of projections 32 defines a first diameter that is denoted by double arrows labeled "D1" in FIG. 3. In this embodiment, each projection of the plurality of projections 32 of glove 10 show in FIGS. 1-3 defines the first diameter D1 meaning that the structural configuration of the plurality of projections 32 is symmetrical and repeated continuously along each surface treatment of the plurality of surface treatments 30. In one instance, the first diameter of each projection of the plurality of projections 32 is measured between 0.7 mm to 0.8 mm. Additionally, each projection of the plurality of projections 32 defines a height measured between the base 32*a* to the tip 32*b*; such height is denoted by double arrows labeled "H" in FIG. 3. It should be noted that the height "H" dimension of each projection of the plurality of projections 32 may be substantially similar to or equal to the diameter "D1" dimension of each projection of the plurality of projections 32.

While each projection of the plurality of projections 32 defines the first diameter D1 as discussed above and as shown in FIGS. 1-3, other exemplary embodiments that include one or more different structural configurations or different diameters of a plurality of projections may be contemplated.

Figure 4A:
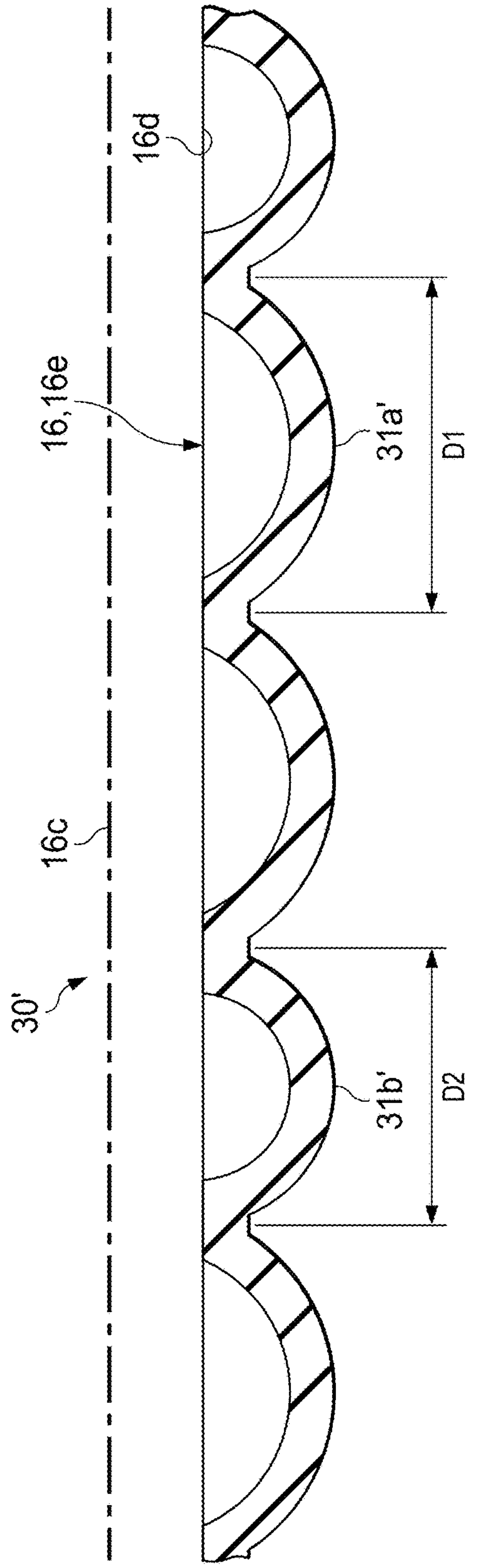
FIG. 4A is a partial sectional view of a second embodiment of a glove in accordance with the present disclosure.

In one embodiment, and as best seen in FIG. 4A, a first or alternative surface treatment 30' is shown and may be provided on a palm region (such as palm region 14) and/or on one or more digit regions (such as digit regions 16, 18, 20, 22, 24). Similar to the embodiment shown in FIG. 3, a first group of projections 31*a*' of a plurality of projections 32' defines a first diameter that is denoted by double arrows labeled "D1" in FIG. 4A. However, in this alternative embodiment, a second group of projections 31*b*' of the plurality of projections 32' defines a second diameter that is denoted by double arrows labeled "D2" in FIG. 4A; the second diameter is different from the first diameter. More particularly in this alternative embodiment, the second diameter D2 is less than the first diameter D1. With this, each projection of the plurality of projections 32' may define the first diameter D1 or the second diameter D2 meaning that the structural configuration of the plurality of projections 32' is asymmetrical and is provided in a random order along each surface treatment of the plurality of surface treatments 30'. In one instance, the first diameter of each projection of the first group of projections 31*a*' is measured between 0.7 mm to 0.8 mm, and the second diameter of each projection of the second group of projections 31*b*' is measured between 1.0 mm to 1.2 mm.

Figure 4B:
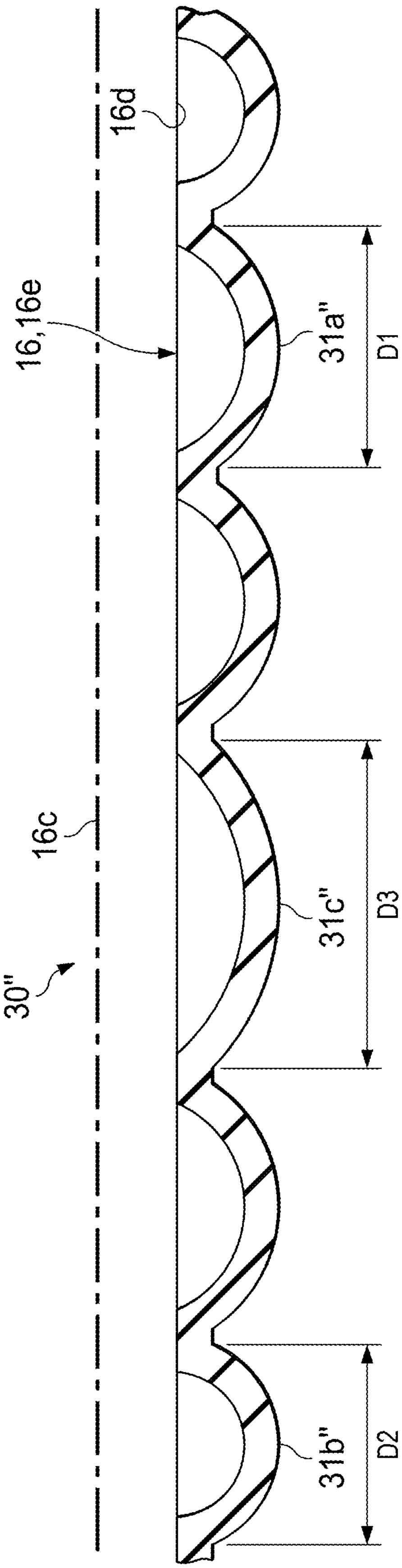
FIG. 4B is a partial sectional view of a third embodiment of a glove in accordance with the present disclosure.

In another embodiment, and as best seen in FIG. 4B, a second or another alternative surface treatment 30" is shown and may be provided on a palm region (such as palm region 14) and/or on one or more digit regions (such as digit regions 16, 18, 20, 22, 24). Similar to the embodiment shown in FIG. 3, a first group of projections 31*a*" of a plurality of projections 32" defines a first diameter that is denoted by double arrows labeled "D1" in FIG. 4B. However, in this alternative embodiment, a second group of projections 31*b*" of the plurality of projections 32" defines a second diameter that is denoted by double arrows labeled "D2" in FIG. 4B, and a third group of projections 31*c*" of the plurality of projections 32" defines a third diameter that is denoted by double arrows labeled "D3" in FIG. 4B. In this alternative embodiment, the first diameter, the second diameter, and the third diameter are different from one another. More particularly in this alternative embodiment, the second diameter D2 is less than the first diameter D1, and the third diameter D3 is greater than the first diameter D1. In this embodiment, each projection of the plurality of projections 32" may define the first diameter D1, the second diameter D2, or the third diameter D3 meaning that the structural configuration of the plurality of projections 32" is asymmetrical and is provided in a random order along each surface treatment of the plurality of surface treatments 30". In one instance, the first diameter of each projection of the first group of projections 31*a*" is measured between 0.7 mm to 0.8 mm, and the second diameter of each projection of the second group of projections 31*b*" is measured between 1.0 mm to 1.2 mm, the third diameter of each projection of the third group of projections 31*c*" is measured between 1.3 mm to 1.4 mm.

It should be understood that any embodiment of the surface treatments discussed herein, including surface treatments 30, 30', 30", may be used on the palm region 14 and/or one or more digit regions of the plurality of digit regions discussed herein.

The glove 10 disclosed herein is fabricated from any suitable glove material such as nitrile, nitrile rubber, or natural rubber. The glove material preferably is free of or essentially free of zinc and/or sulfur and/or fluoride, and/or cross-links, and/or accelerators and/or accelerants. Some accelerators/accelerants that the glove's material may be free of or essentially free of may include carbonates or thiurams. The glove material which is free of or essentially free of zinc and/or sulfur and/or fluoride, and/or cross-links, and/or accelerators and/or accelerants will at least comprise a portion of the glove which will contact the user's skin when the glove is worn. The composition of the disclosed glove may tend to reduce hypersensitivity or allergic reactions in populations which may be required to frequently wear protective gloves, such as medical practitioners. Additionally, glove 10 may have an exterior surface of one color and an interior surface of another color, particularly a strongly contrasting color. This difference in color between the interior and exterior surfaces of the glove may act as a tear or cut indicator since, if the interior color is visible on the exterior of the glove, the person wearing the glove will realize that the exterior surface has been compromised in some way.

Figure 5A:
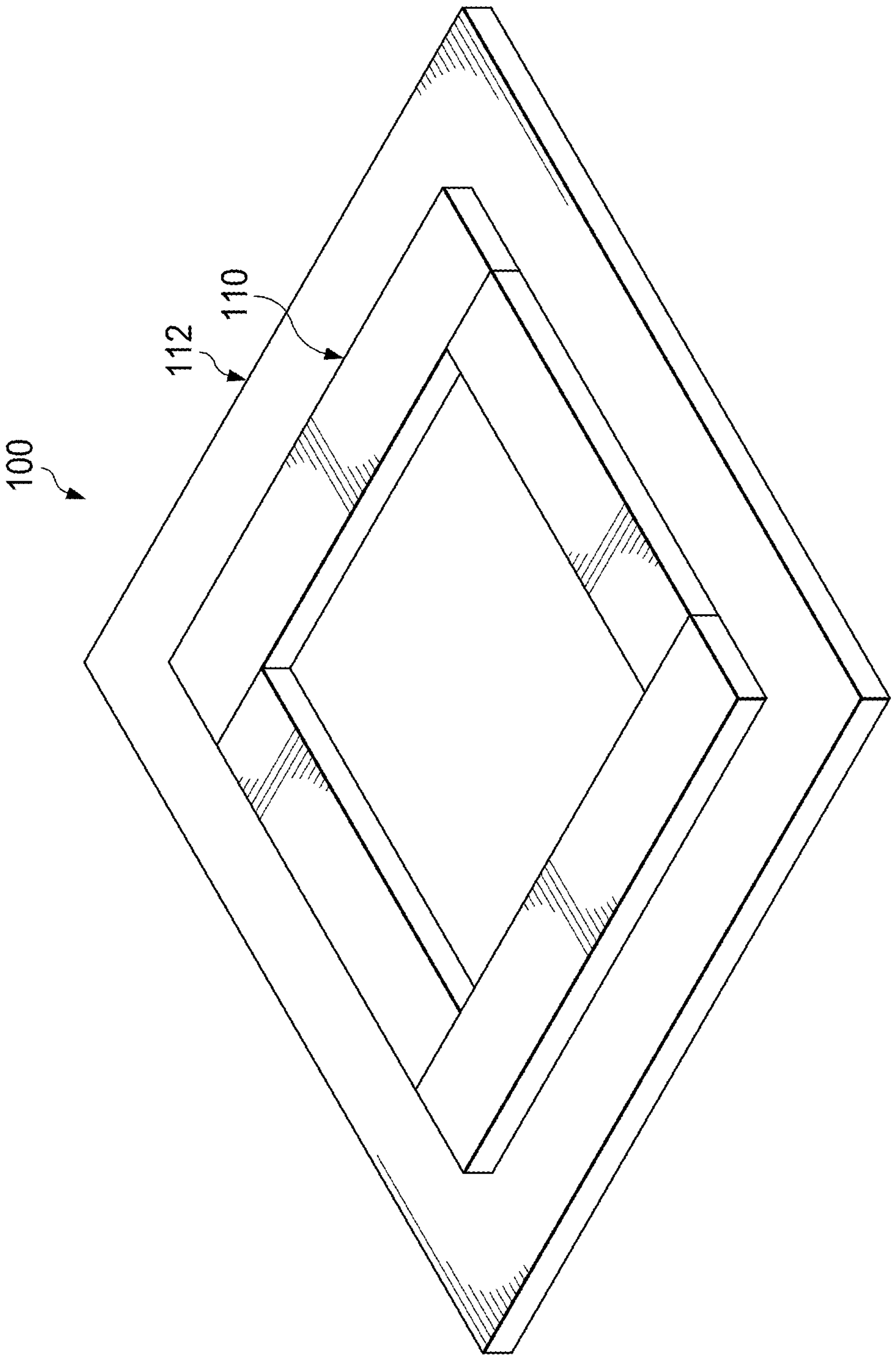
FIG. 5A is an operational view of a pattern frame used to form surface treatment.

Having now discussed the components of the glove 10, a method of manufacturing glove 10 with a system 100 is now discussed in greater detail below and is shown in FIGS. 5A-7C Initially, a pattern plate or frame 110 of system 100 is placed on a support 112 (see FIG. 5A). It should be noted that while a single pattern plate 110 is shown, system 100 may include one or more pattern plates 110 to manufacture one or more embodiments of gloves mentioned herein, including surface treatments 30, 30', 30" discussed above. In the present disclosure, the pattern plate 110 defines a two-dimensional square shape when viewed from a top plan view or top perspective view (see FIG. 5A). In other exemplary embodiment, pattern plate 110 may define any suitable shape or configuration dictated by the implementation of the pattern plate to assist in forming and manufacturing a desired glove discussed herein.

Figure 5B:
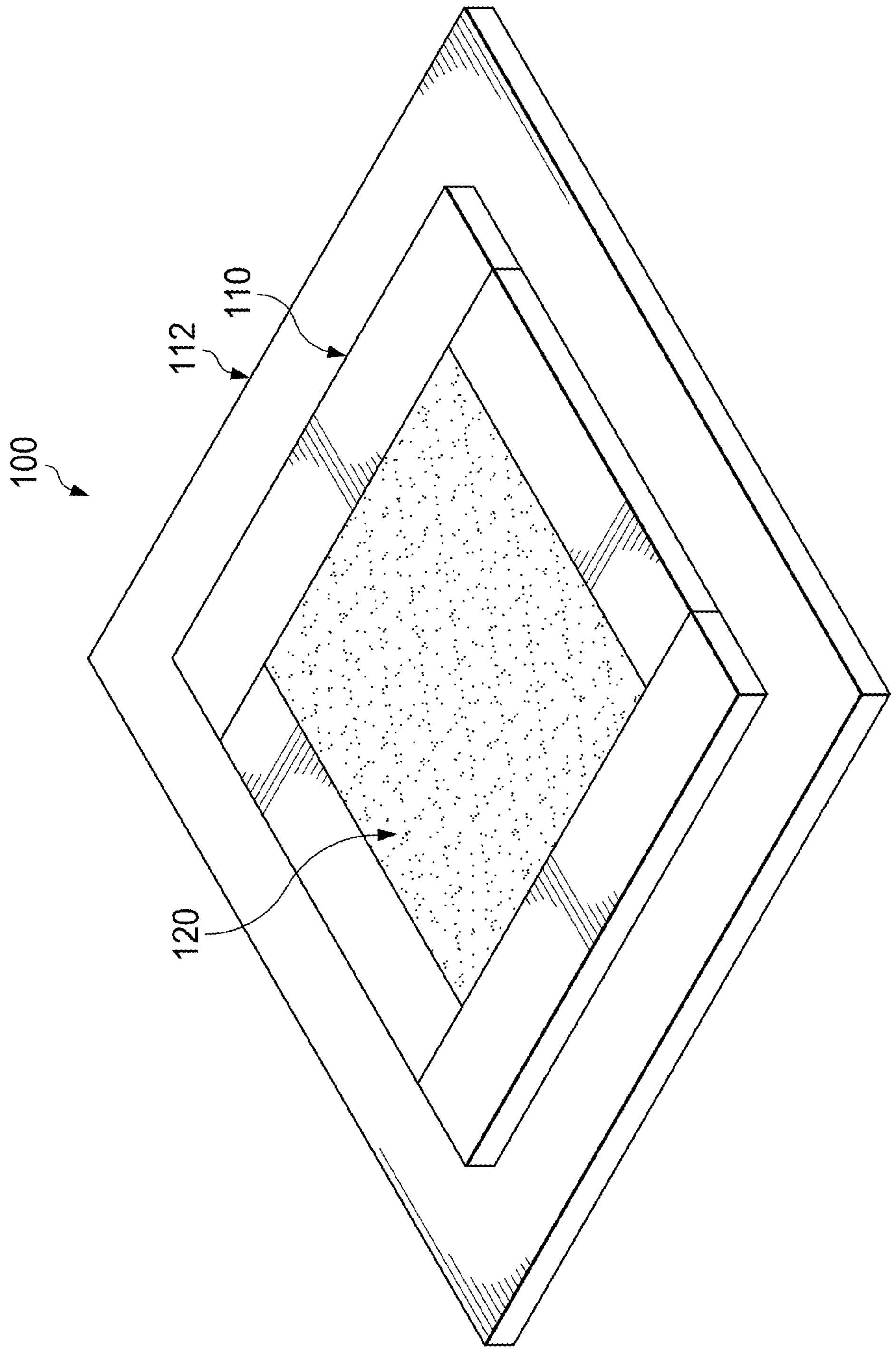
FIG. 5B is another operational view continuing from FIG. 5A, wherein a non-cured forming material is inserted into the pattern frame.

Once the pattern plate 110 is set to a desired configuration, an operator may then apply a forming material 120 inside of the pattern plate 110 (see FIG. 5B). In the present disclosure, forming material 120 is desired to be a ceramic material that is currently shown in an uncured and/or compliant state. As such, the forming material 120 may be manipulated by the operator until the forming material 120 is completely disposed inside of the pattern plate 110 to the operator's desire. In other exemplary embodiments, forming material 120 may be any suitable material that may be manipulated by an operator and by other external forming devices that may imprint textures or patterns into the forming material, which is discussed in greater detail below.

Figure 5C:
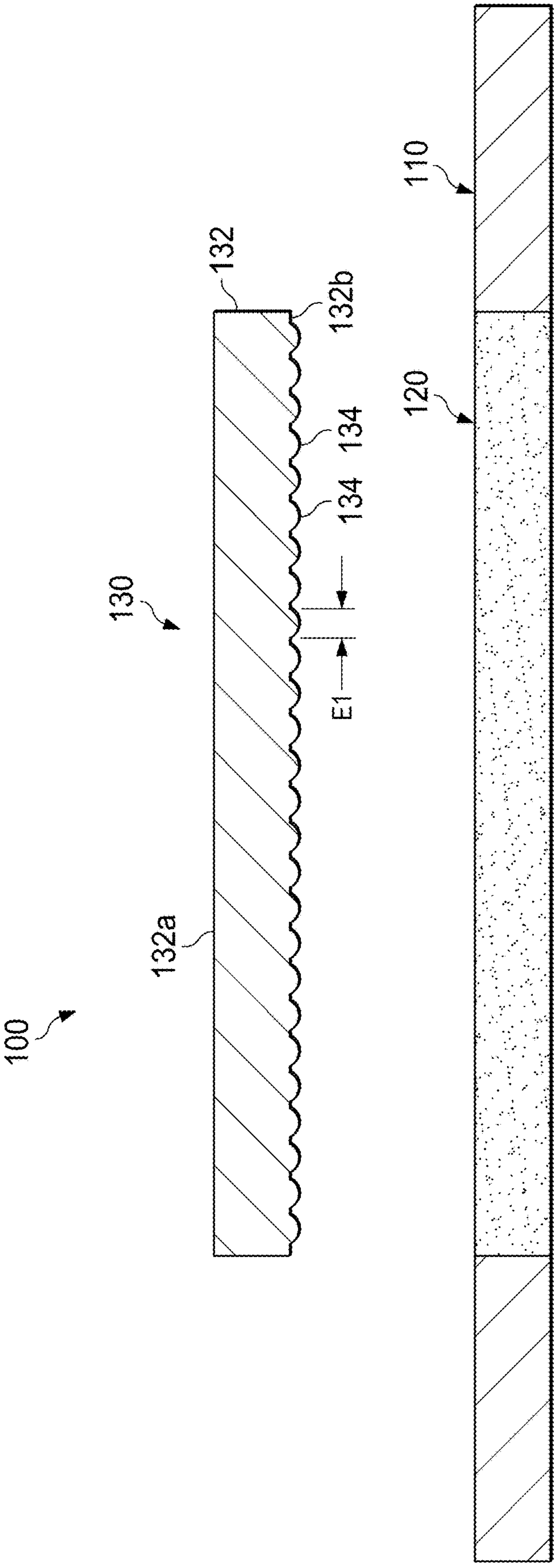
FIG. 5C is another operational view continuing from FIG. 5C, wherein a former having a plurality of extensions is introduced above the non-cured forming material and the pattern frame.
Figure 5D:
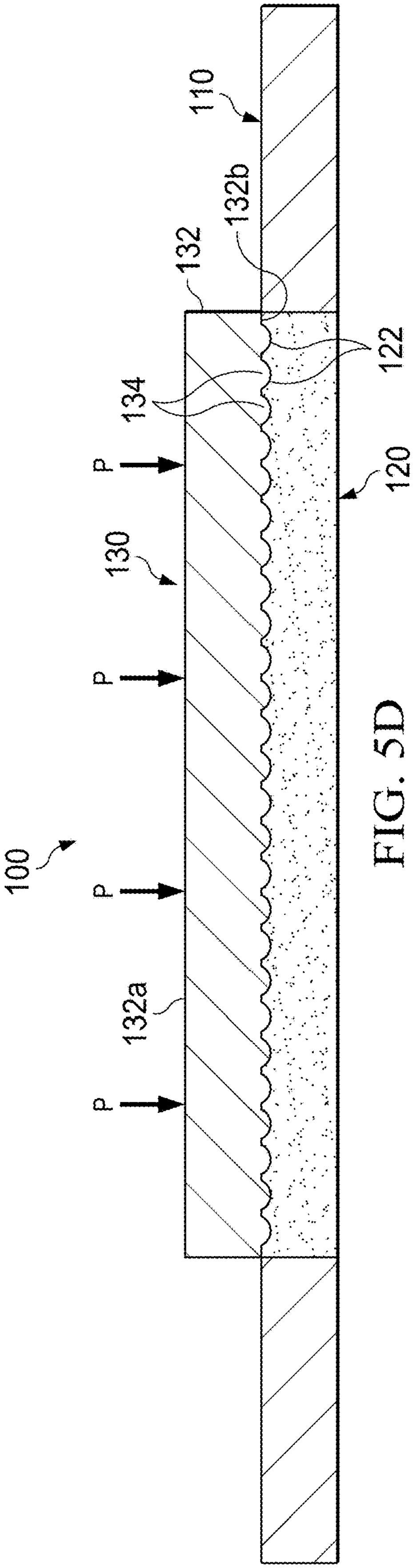
FIG. 5D is another operational view continuing from FIG. 5C, wherein the former is pressed into the non-cured forming material.

At this stage, a former 130 of the system 100 may then be introduced to the pattern plate 110 and the forming material 120 disposed inside of the pattern plate 110 (see FIG. 5C). As shown in FIG. 5C, former 130 includes a main body 132 that includes a first end 132*a* facing away from the pattern plate 110 and the forming material 120, and a second end 132*b* opposite to the first end 132*a* and facing towards the pattern plate 110 and the forming material 120. Former 130 also includes a plurality of extensions 134 that operably engages with and extends outwardly from the second end 132*b*. In the present disclosure, the plurality of extensions 134 is separable from the main body 132 so that different types of extensions may be used with main body 132, which are discussed in greater detail below. In one exemplary embodiment, it has been contemplated that the plurality of extensions 134 may also being integral with the main body 132 at the second end 132*b* such that the main body 132 and the plurality of extensions 134 define a unitary, monolithic device.

Figure 5E:
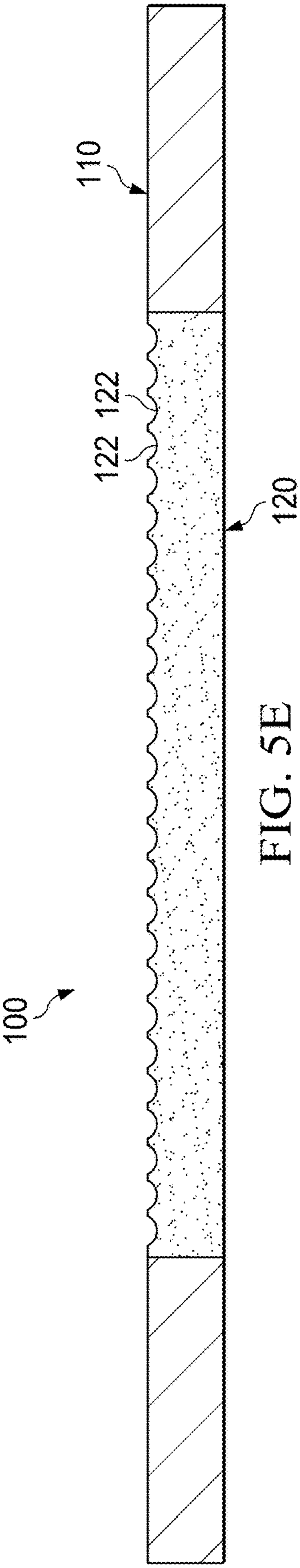
FIG. 5E is another operational view continuing from FIG. 5D, wherein the surface treatment is formed into the non-cured forming material by said former.

As shown in FIG. 5C, each extension of the plurality of extensions 134 defines a diameter that corresponds to diameter of each projection of the plurality of projections 32 of the surface treatment 30. In the present disclosure, each extension of the plurality of extensions 134 defines a first diameter "E1" that is consistent along the second end 132*b* of the main body 132. With such configuration, the plurality of extensions 134 applies a uniform and/or symmetrical surface treatment 122 along the forming material 120 when the former 130 is pressed into said forming material 120; such pressure applied on the forming material 120 by the former 130 is denoted by arrows labeled "P" in FIG. 5D. Once a desired amount of pressure is applied on the forming material 120 by the former 130, the former 130 is then removed from the forming material 120 thus imprinting a first surface treatment 122 on the forming material 120. As best seen in FIG. 5E, the first surface treatment 122 now defined on the forming material 120 is a second inverse pattern of the first pattern defined by the plurality of extensions 134 of the former 130. As discussed in greater detail below, such inverse pattern and/or structural configuration assists in creating the plurality of projections 32 of the surface treatment 30 provided on the glove 10.

While each extension of the plurality of extensions 134 is shown and described as having the same diameter, it is contemplated that one or more extensions or groups of extensions of the plurality of extensions 134 of former 130 may define two or more diameters for forming two or more groups of projections of a plurality of projections on a glove discussed herein.

Figure 6A:
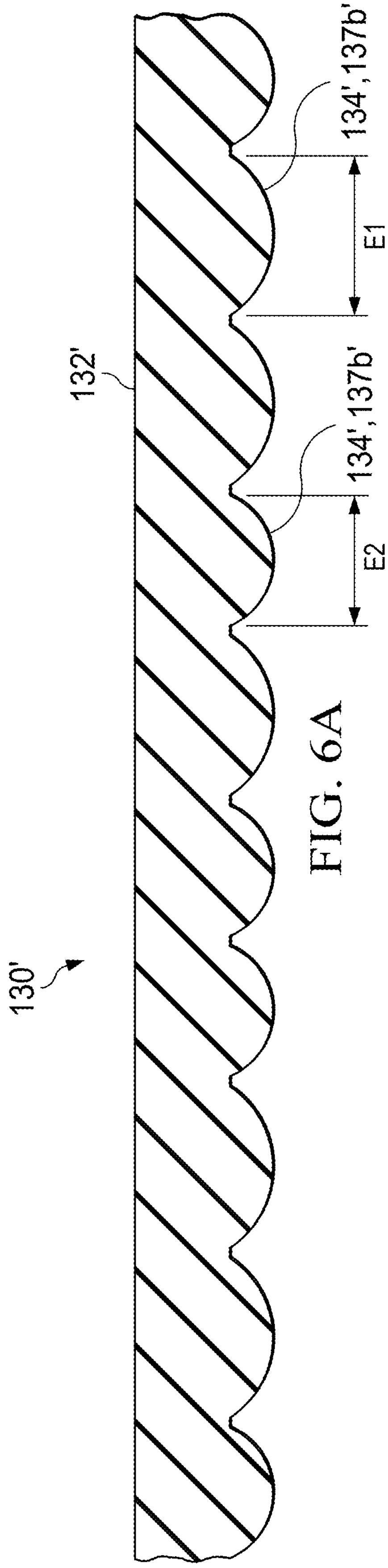
FIG. 6A is an alternative former of the system having a first group of extensions and a second group of extensions of the plurality of extensions.

In one alternative embodiment, and as best seen in FIG. 6A, an alternative former 130' includes a main body 132' identical to main body 132. However, in this alternative embodiment, former 130' includes a plurality of extensions 134' that includes a first group of extensions 134*a'* and a second group of extensions 134*b'*. As shown in FIG. 6A, each extension of the first group of extensions 134*a'* defines a first diameter (denoted E1 similar to the plurality of extensions 134 mentioned above) that ultimately forms a first group of projections of a glove with each projection defining a matching first diameter, and each extension of the second group of extensions 134*b'* defines a second diameter (denoted E2) that ultimately forms a second group of projections of a glove with each projection defining a matching second diameter. In this embodiment, the first diameter E1 of each extension of the first group of extensions 134*a'* is greater than the second diameter E2 of each extension of the second group of extensions 134*b'* thus resulting in an asymmetric and/or variable plurality of projections for a given surface treatment. In one instance, the first diameter of each extension of the first group of extensions 134*a'* is measured between 0.7 mm to 0.8 mm, and the second diameter of each extension of the second group of extensions 134*b'* is measured between 1.0 mm to 1.2 mm.

Figure 6B:
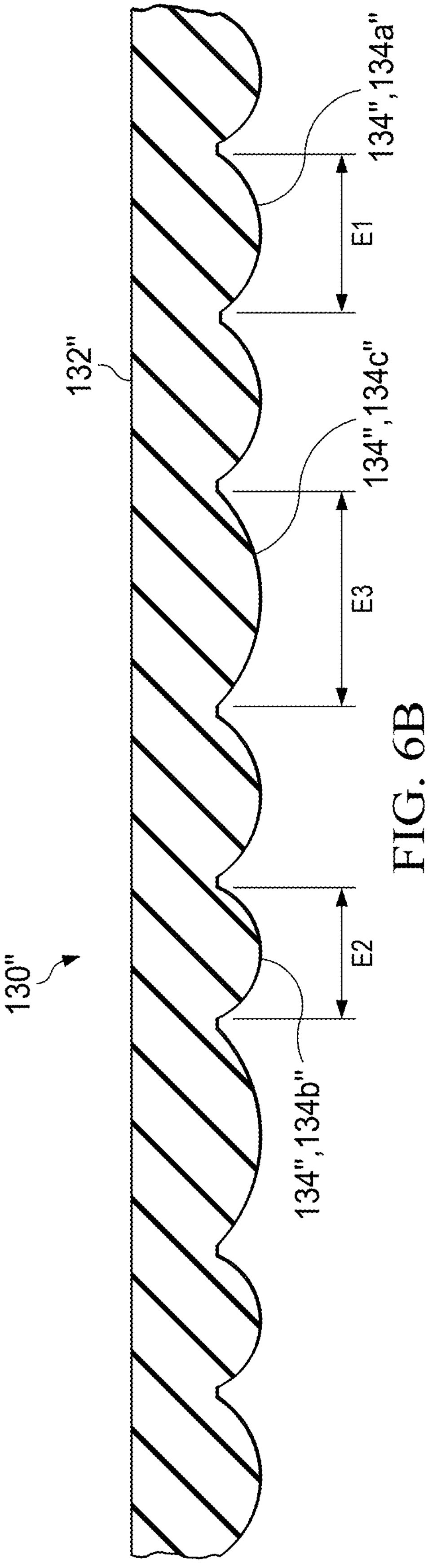
FIG. 6B is another alternative former of the system having a first group of extensions, a second group of extensions, and a third group of extensions of the plurality of extensions.

In another alternative embodiment, and as best seen in FIG. 6B, another alternative former 130" includes a main body 132" identical to main body 132. However, in this alternative embodiment, former 130" includes a plurality of extensions 134" that includes a first group of extensions 134*a"*, a second group of extensions 134*b"*, and a third group of extensions 134*c"*. As shown in FIG. 6B, each extension of the first group of extensions 134*a"* defines a first diameter (denoted E1 similar to the plurality of extensions 134 mentioned above) that ultimately forms a first group of projections of a glove with each projection defining a matching first diameter, each extension of the second group of extensions 134*b"* defines a second diameter (denoted E2) that ultimately forms a second group of projections of a glove with each projection defining a matching second diameter, and each extension of the third group of extensions 134*c"* defines a third diameter (denoted E3) that ultimately forms a third group of projections of a glove with each projection defining a matching third diameter. In this embodiment, the first diameter E1 of each extension of the first group of extensions 134*a"* is greater than the second diameter E2 of each extension of the second group of extensions 134*b"* and is less than the third diameter E3 of each extension of the third group of extensions 134*c"* thus resulting in an asymmetric and/or variable plurality of projections for a given surface treatment of a glove. In one instance, the first diameter of each extension of the first group of extensions 134*a"* is measured between 0.7 mm to 0.8 mm, the second diameter of each extension of the second group of extensions 134*b"* is measured between 1.0 mm to 1.2 mm, and the second diameter of each extension of the third group of extensions 134*c"* is measured between 1.3 mm to 1.4 mm.

It should be noted that each extension of a plurality of extensions of a former mentioned herein may be a commercially-available component or member. In one instance, each extension of a plurality of extensions of a former mentioned herein, including the plurality of extensions 134, 134', and 134", is a ball bearing that operably engages with the second end 132*b* of main body 132. In this instance, each ball bearing used with a former mentioned herein may define any diameter of an extension discussed above and illustrated herein.

While each extension of the pluralities of extensions mentioned herein (e.g., extensions 134, 134', 134") defines a rounded or curvilinear to create rounded or curvilinear projections on a glove, other types of extensions may be used herein that have different sizes, shapes, and configurations based on the intended use of the glove. Exemplary shapes for extensions discussed herein include, but are not limited to, semi-circular, triangular, rectangular or square, pentagonal, hexagonal, heptagonal, octagonal, decagonal, dodecagonal, diamond shaped or another parallelogram, trapezoidal, star-shaped, oval, ovoid, lines or lined, tear-drop-shaped, cross-shaped, donut-shaped, heart-shaped, arrow-shaped, crescent-shaped. or any other type of regular or irregular, symmetrical or asymmetrical configuration.

Figure 7A:
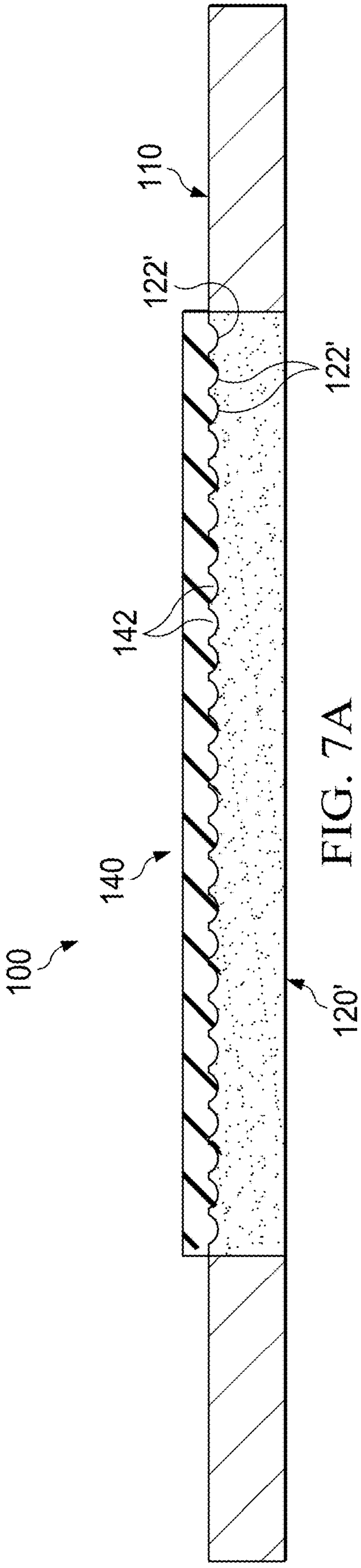
FIG. 7A is an operational view of a mold material be applied to forming material after said forming material is cured (shown in FIG. 5E).
Figure 7B:
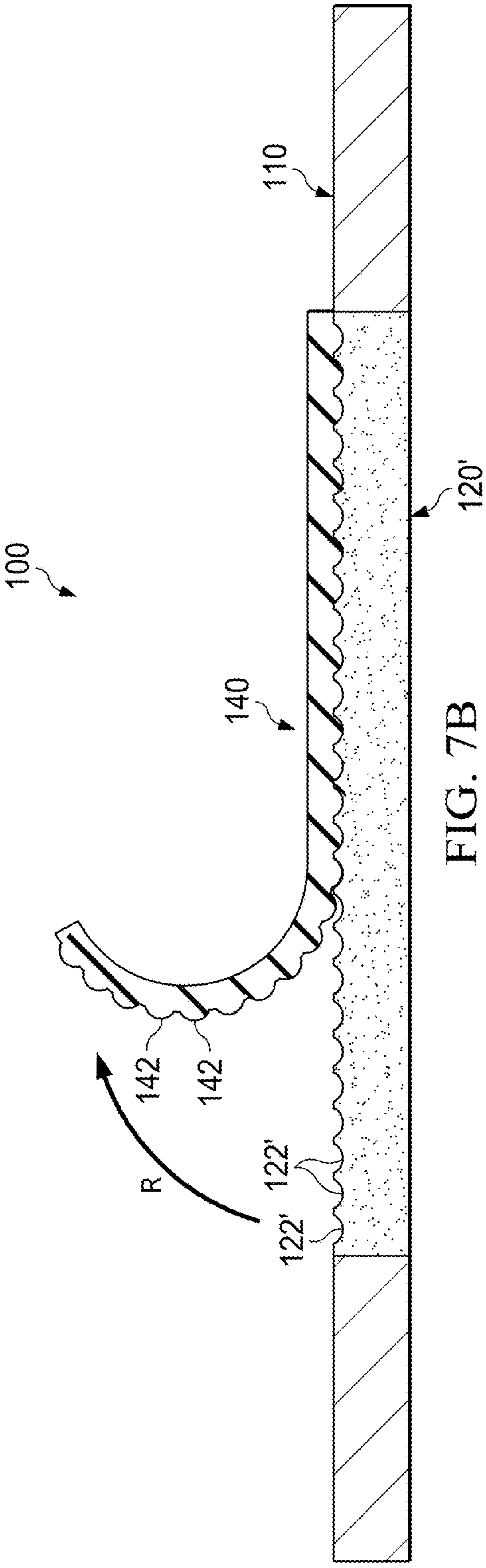
FIG. 7B is another operational view continuing from FIG. 7B, wherein the mold material is removed from the cured forming material and defines an inverse surface treatment.

Turning now to FIG. 7A, the forming material 120 has been cured and permanently retains the surface treatment applied by the former 130; such cured forming material is generally denoted as 120' in FIGS. 7A-7B. Once cured, a mold material 140 may be applied to the cured forming material 120' (see FIG. 7A). At this stage, the mold material 140 settles into a cured first surface treatment 122' of the cured forming material 120' to define a second surface treatment 142; such second surface treatment 142 is the inverse pattern or configuration of the cured first surface treatment 122' of the cured forming material 120'. Once the mold material 140 has rested on the cured forming material 120' for a desired amount of time, the mold material 140 may be removed in which the mold material 140 retains the second surface treatment 142 (FIG. 7B).

It should be understood that the mold material 140 may be a flexible and/or compliant material that is capable of being deformed and capable of retaining various shapes depending on the force applied to said mold material 140. In one example, mold material 140 may be rubber molding material that is flexible while being capable of retaining and deforming to a particular shape or surface treatment based on force applied to the material when interfacing with a rigid or stiff object (such as cured forming material 120').

Figure 8A:
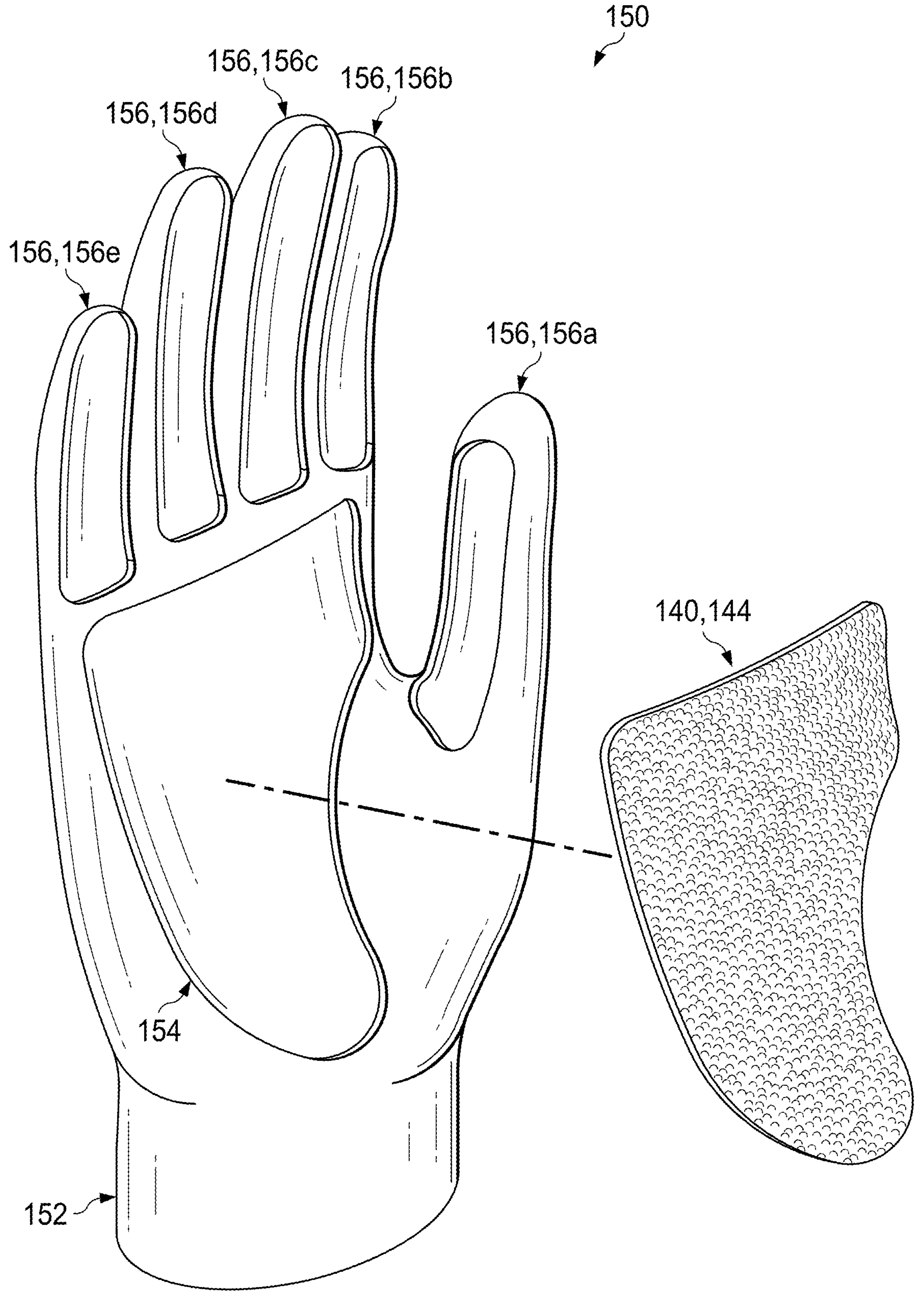
FIG. 8A is an operational view of the mold material being applied to a palm portion of a master mold.
Figure 8B:
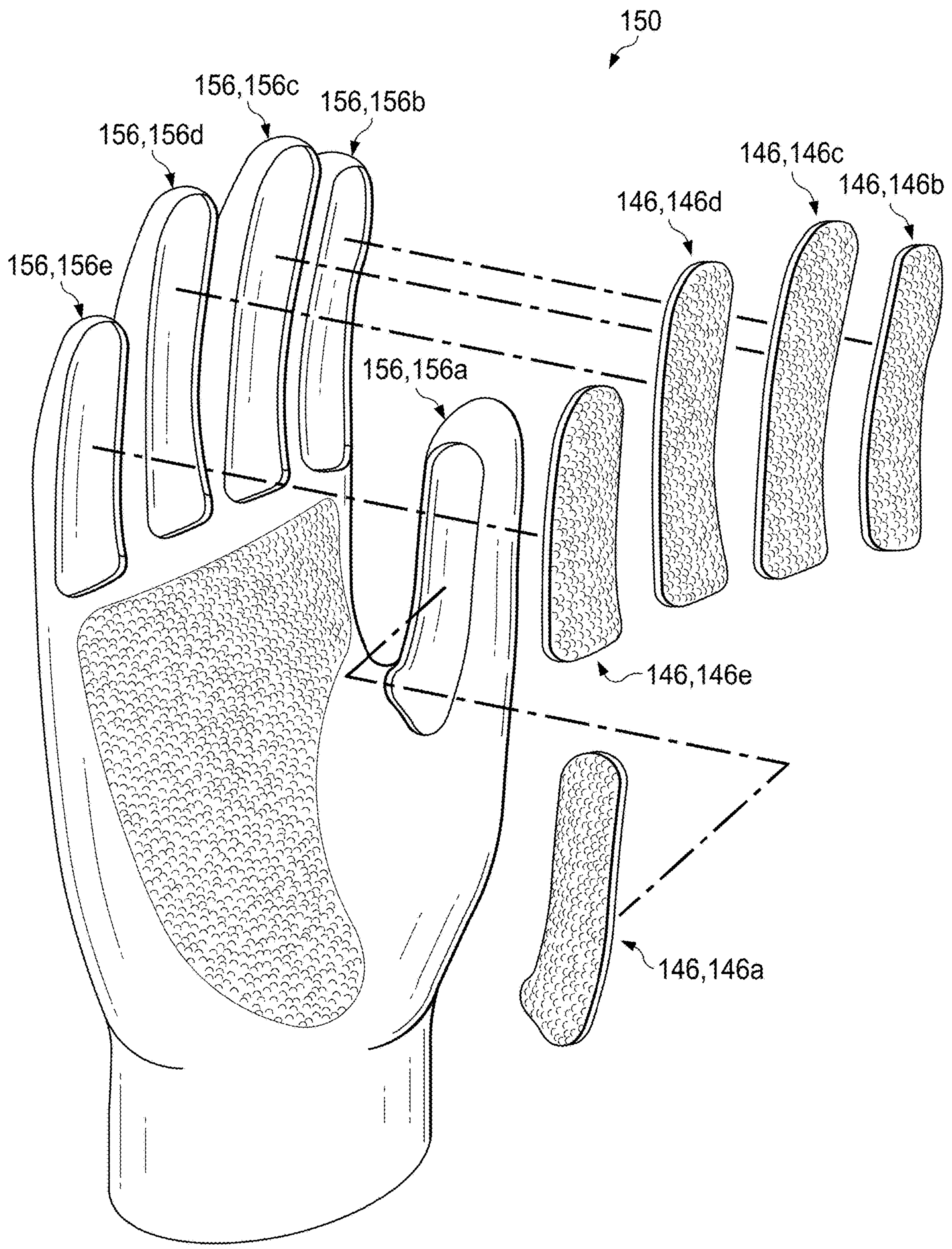
FIG. 8B is another operational view continuing from FIG. 8A, wherein the mold material is applied to digit portions of the master mold.

Once the mold material 140 is provided with a desired surface treatment (e.g., second surface treatment 142), an operator or technician may then separate the mold material 140 into one or more sections or portions to be applied to a master mold 150. In one instance, and as best seen in FIG. 8A, a first or palm section 144 of the mold material 140 may be applied above a wrist region 152 of the master mold 150 and inside of a recess defined in a palm region 154 of the master mold 150. In another instance, and as best seen in FIG. 8B, a second or digit sections 146 of the mold material 140 may be applied inside of recesses defined in digit regions 156 of the master mold 150. In this embodiment, a first digit section **146*a* of the mold material 140 is applied to a first or thumb region 156*a* of the master mold 150, a second digit section 146*b* of the mold material 140 is applied to a second or pointer finger region 156*b* of the master mold 150, a third digit section 146*c* of the mold material 140 is applied to a third or middle finger region 156*c* of the master mold 150, a fourth digit section 146*d* of the mold material 140 is applied to a fourth or ring finger region 156*d* of the master mold 150, and a fifth digit section 146*e* of the mold material 140 is applied to a fifth or little finger region 156*e* of the master mold 150. In other exemplary embodiments, one or more digit regions 156 of the master mold 150 may be free from receiving a section of the mold material 140 dictated by the intended use of a glove that will be formed by the master mold 150**.

Figure 8C:
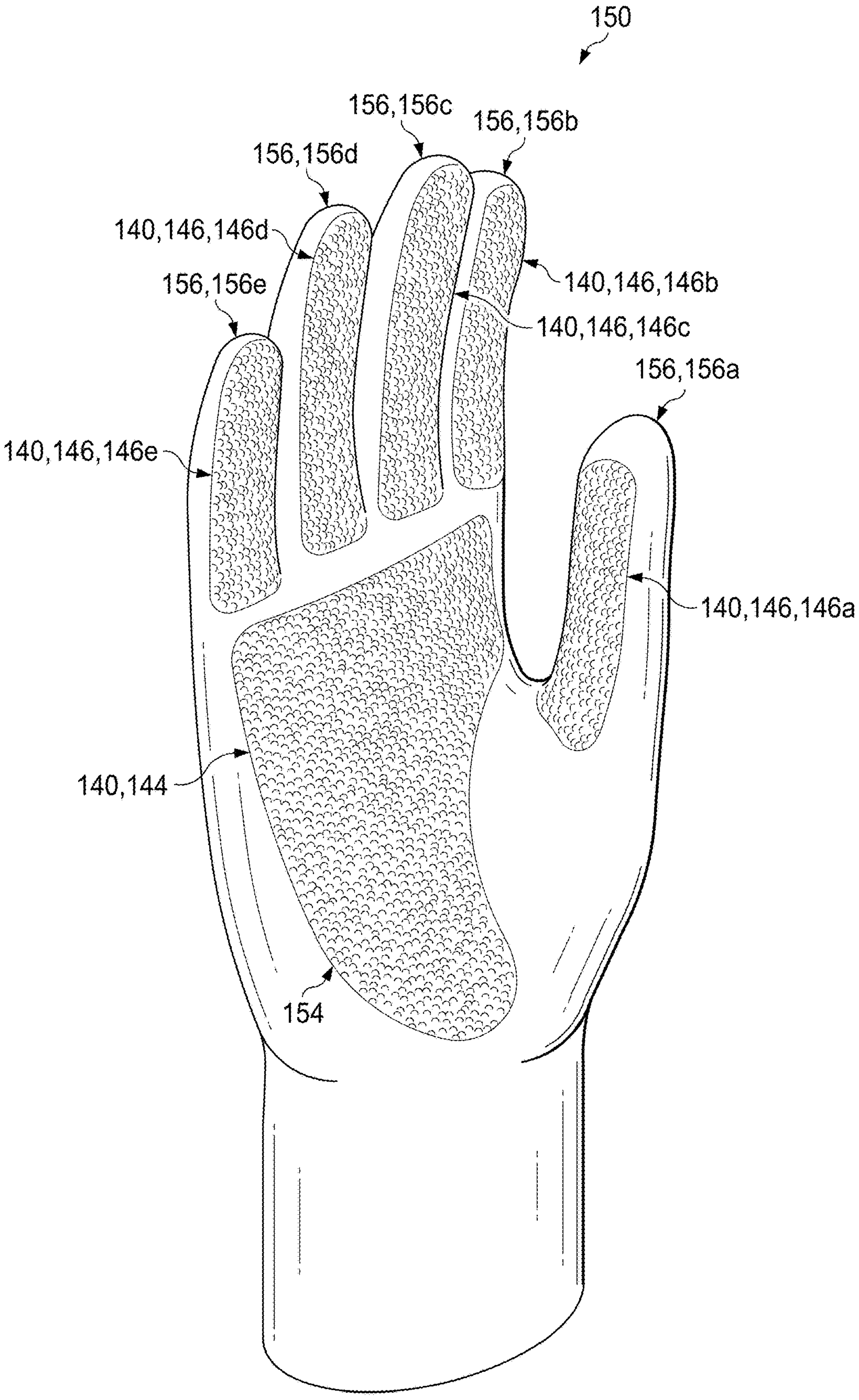
FIG. 8C is another operational view continuing from FIG. 8B showing the master mold having the mold material applied to the palm portion and the digit portions.
Figure 9A:
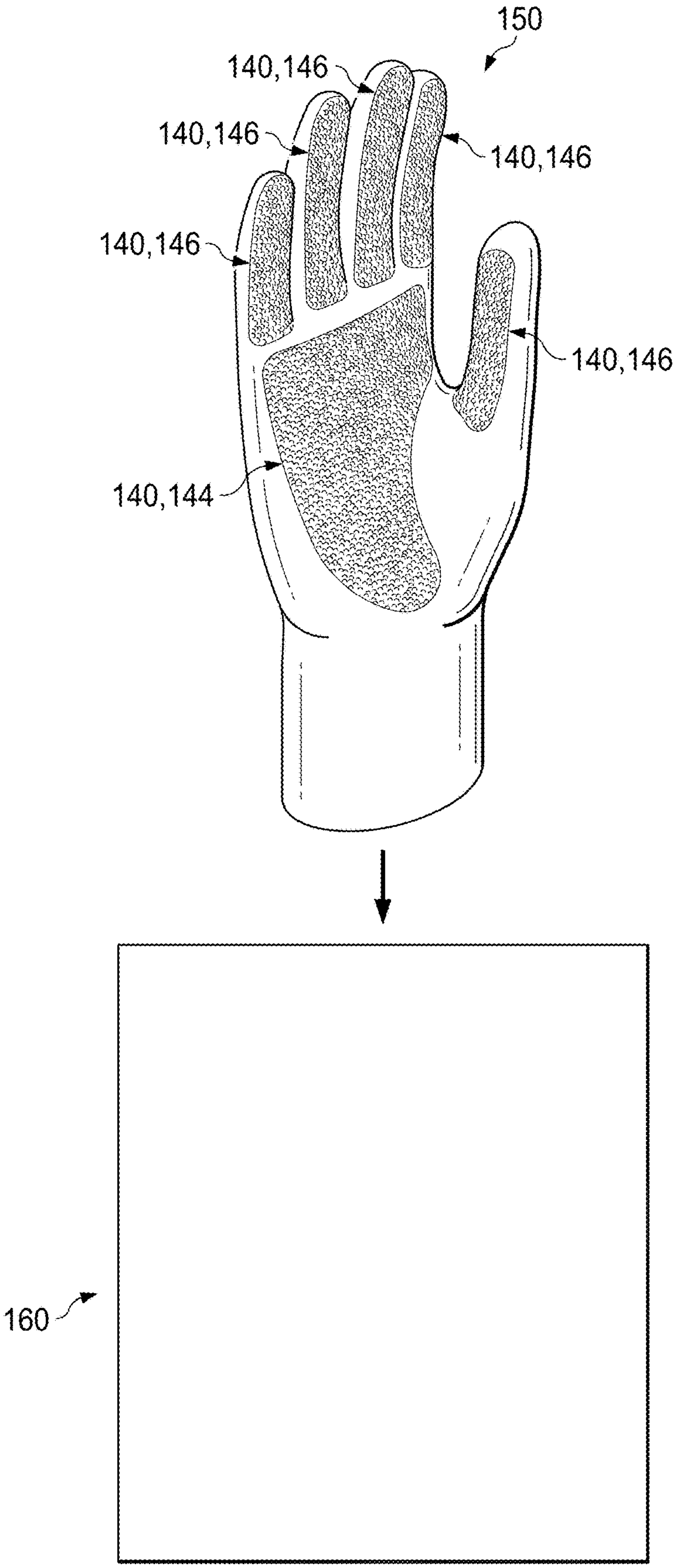
FIG. 9A is an operational view of the master mold being placed inside of a caster mold.
Figure 9B:
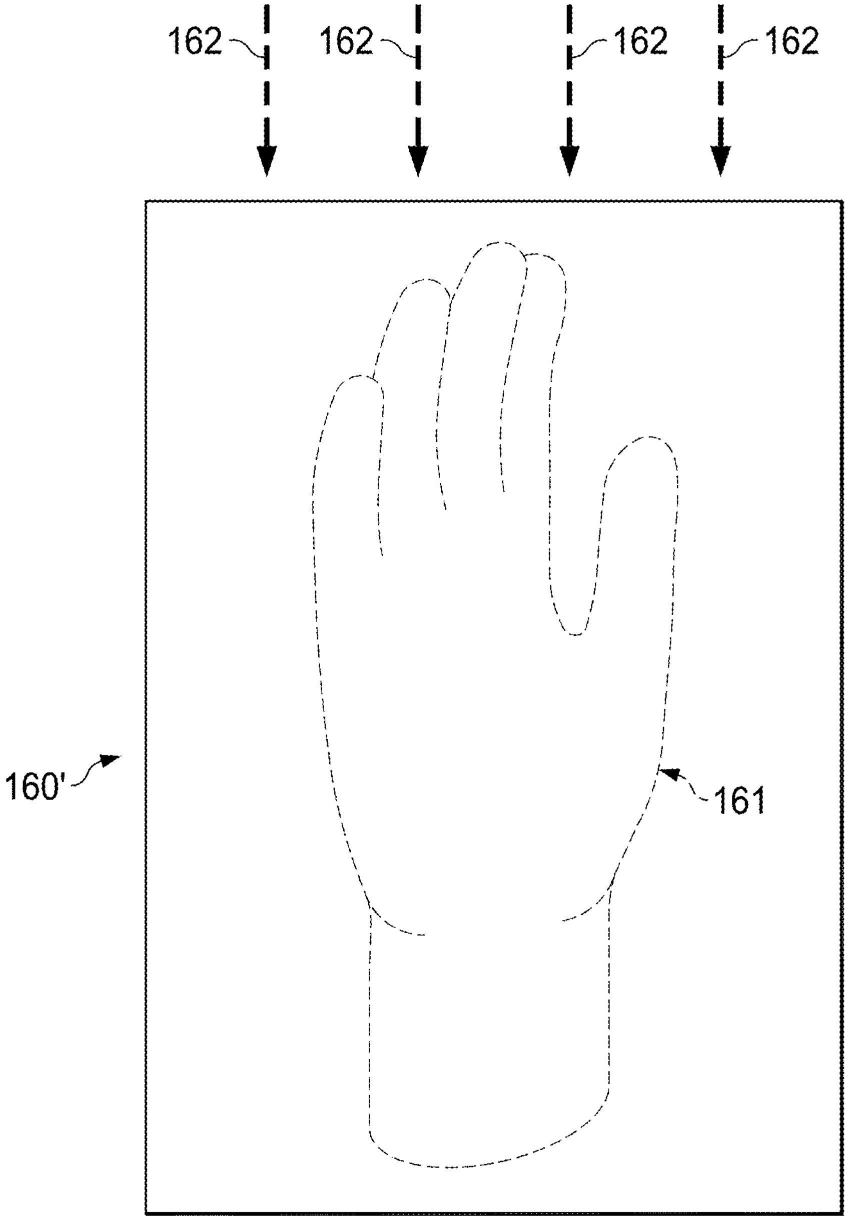
FIG. 9B is another operational view continuing from FIG. 9A, wherein ceramic material is injected into the caster mold subsequent to the master mold imparting a negative pattern of the master mold.

Once the master mold 150 has the desired amount of mold material 140 applied to one or more of the wrist region 152, the palm region 154, and the digit regions 156 (see FIG. 8C), the master mold 150 is then placed into a casting mold 160 for a desired amount of time until the casting mold 160 retains a third surface treatment that is an inverse configuration of the master mold 150 having the second surface treatment 142 (see FIG. 9A). Once the master mold 150 is removed and the casting mold 160 has cured (denoted 160' in FIG. 9B), the casting mold 160 is imparted with a negative mold or pattern 161 of the master mold 150. At this stage, a ceramic material 162 is then poured into the cured casting mold 160' and rests until the ceramic material 162 is cured and/or hardened (see FIG. 9B). Once the ceramic material 162 is cured after a desired amount of time, the cured ceramic material 162 defines a fourth surface treatment that is an inverse configuration of the master mold 150 to produce a production mold (i.e., a positive mold or pattern) to form positive surface treatment (such as surface treatments 30, 30', 30") on a glove (such as glove 10). It should be noted that such casting operations may also follow conventional and/or commercially-available techniques or procedures that are commonly used in the casting industry.

Figure 11:
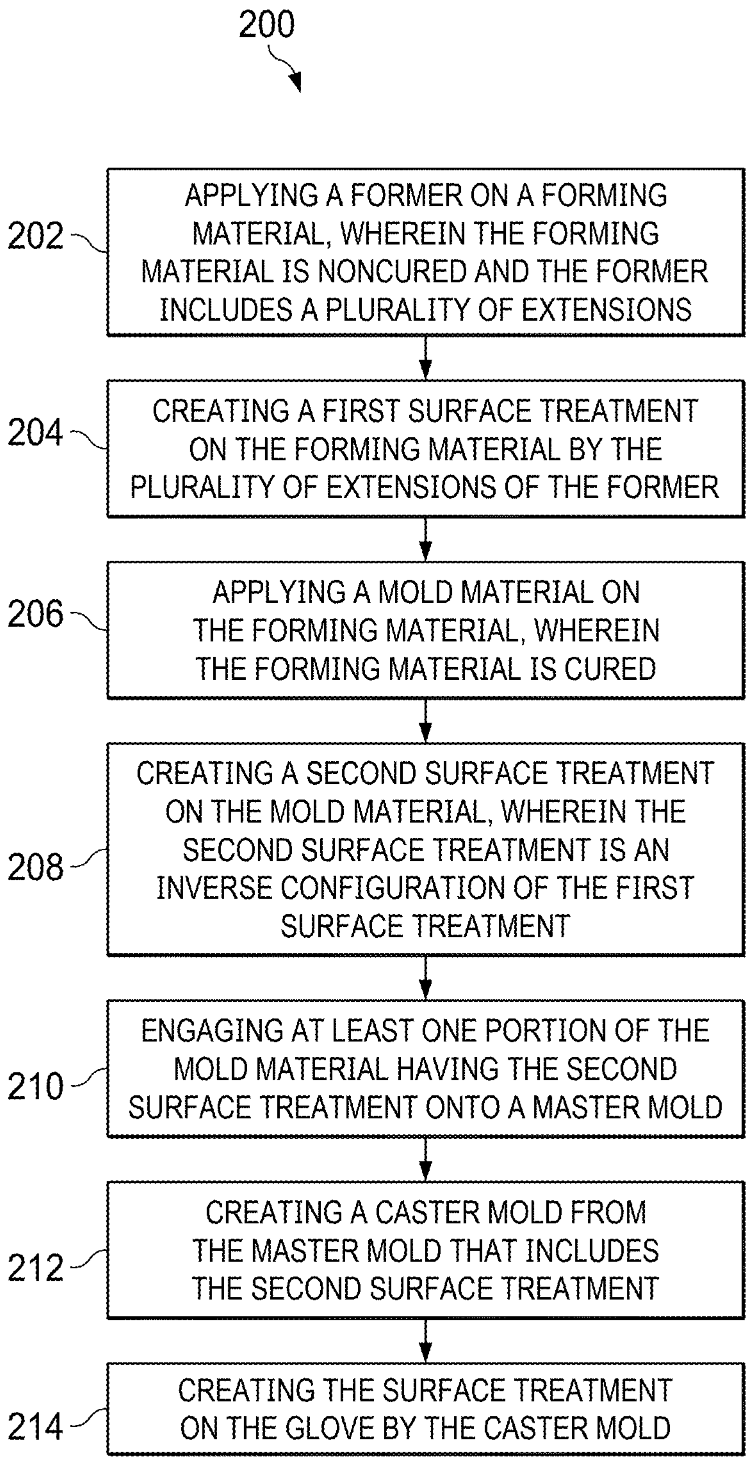
FIG. 11 is a flowchart of an exemplary method of creating a surface treatment on a glove.

FIG. 11 is a method 200 of creating a glove surface treatment on a glove. An initial step 202 of method 200 includes applying a former on a forming material, wherein the forming material is non-cured and the former includes a plurality of extensions. Another step 204 of method 200 includes creating a first surface treatment on the forming material by the plurality of extensions of the former. Another step 206 of method 200 includes applying a mold material on the forming material, wherein the forming material is cured. Another step 208 of method 200 includes creating a second surface treatment on the mold material, wherein the second surface treatment is an inverse configuration of the first surface treatment. Another step 210 of method 200 includes engaging at least one portion of the mold material having the second surface treatment onto a master mold. Another step 212 of method 200 includes creating a caster mold from the master mold that includes the second surface treatment. Another step 214 of method 200 includes creating the glove surface treatment on the glove by the caster mold.

In other exemplary embodiments, additional or optional steps may be included with method 200 of creating a surface treatment on a glove. In one exemplary embodiment, method 200 may further include that each extension of the plurality of extensions defines a curvilinear shape. In another exemplary embodiment, method 200 may further include that each extension of the plurality of extensions is a ball bearing. In another exemplary embodiment, method 200 may further include that the step of creating the first surface treatment on the forming material further includes that the first surface treatment is a negative surface; and wherein the step of creating the second surface treatment on the mold material further includes that the second surface treatment is a positive surface. In another exemplary embodiment, method 200 may further include that the step of creating the first surface treatment on the forming material further includes that the first surface treatment is a plurality of concave surfaces; and wherein the step of creating the second surface treatment on the mold material further includes that the second surface treatment is a plurality of convex surfaces. In another exemplary embodiment, method 200 may further include that the step of creating the first surface treatment on the forming material further comprises: applying a first group of extensions of the plurality of extensions on the forming material, wherein each extension of the first group of extensions defines a first diameter; and applying a second group of extensions of the plurality of extensions on the forming material, wherein each extension of the second group of extensions defines a second diameter that is greater than the first diameter of each extension of the first group of extensions. In another exemplary embodiment, method 200 may further include that the step of applying the first group of extensions of the plurality of extensions on the forming material further includes that the first diameter of each extension of the first group of extensions is between 0.7 mm to 0.8 mm; and wherein the step of applying the second group of extensions of the plurality of extensions on the forming material further includes that the second diameter of each extension of the second group of extensions is between 1.0 mm to 1.2 mm. In another exemplary embodiment, method 200 may further include that the step of creating the first surface treatment on the forming material further comprises: applying a first group of extensions of the plurality of extensions on the forming material, wherein each extension of the first group of extensions defines a first diameter; applying a second group of extensions of the plurality of extensions on the forming material, wherein each extension of the second group of extensions defines a second diameter that is greater than the first diameter of each extension of the first group of extensions; and applying a third group of extensions of the plurality of extensions on the forming material, wherein ach extension of the third group of extensions defines a third diameter that is greater than the second diameter of each extension of the second group of extensions. In another exemplary embodiment, method 200 may further include that the step of applying the first group of extensions of the plurality of extensions on the forming material further includes that the first diameter of each extension of the first group of extensions is between 0.7 mm to 0.8 mm; wherein the step of applying the second group of extensions of the plurality of extensions on the forming material further includes that the second diameter of each extension of the second group of extensions is between 1.0 mm to 1.2 mm; and wherein the step of applying the third group of extensions of the plurality of extensions on the forming material further includes that the third diameter of each extension of the third group of extensions is between 1.3 mm to 1.4 mm. In another exemplary embodiment, method 200 may further include that the step of engaging the at least one portion of the mold material having the second surface treatment further comprises: engaging the at least one portion of the mold material having the second surface treatment to a palm of the master mold. In another exemplary embodiment, method 200 may further include that the step of engaging the at least one portion of the mold material having the second surface treatment further comprises: engaging the at least one portion of the mold material having the second surface treatment to at least one digit of the master mold. In another exemplary embodiment, method 200 may further include that the step of engaging the at least one portion of the mold material having the second surface treatment further comprises: engaging a first portion of the mold material having the second surface treatment to a palm of the master mold; and engaging a second portion of the mold material having the second surface treatment to at least one digit of the master mold. In another exemplary embodiment, method 200 may further include that the glove surface treatment includes a first plurality of projections where each projection of the first plurality of projection defines a first diameter; and wherein the glove surface treatment includes a second plurality of projections where each projection of the second plurality of projections defines a second diameter that is equal to the first diameter. In another exemplary embodiment, method 200 may further include that the glove surface treatment includes a first plurality of projections where each projection of the first plurality of projection defines a first diameter; wherein the glove surface treatment includes a second plurality of projections where each projection of the second plurality of projections defines a second diameter that is one of greater than or less than the first diameter.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Any flowchart and/or block diagrams in the Figures illustrate some exemplary architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of,"

"only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc. As another example, "at least one of: A, B, or B" is intended to cover A, B, C, A-B, A-C, B-C, and A-B-C, as well as any combination with multiple of the same item.

While components of the present disclosure are described herein in relation to each other, it is possible for one of the components disclosed herein to include inventive subject matter, if claimed alone or used alone. In keeping with the above example, if the disclosed embodiments teach the features of A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present disclosure.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments. Furthermore, the use of any and all examples or exemplary language ("e.g.," "such as," or the like) is intended merely to better illustrate or illuminate the embodiments and does not pose a limitation on the scope of that or those embodiments. No language in this specification should be construed as indicating any unclaimed element as essential to the practice of the disclosed embodiment.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element or "another" element, that does not preclude there being more than one of the additional element or the another element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein. Further, recitation of ranges of values herein are not intended to be limiting, referring instead individually to any and all values falling within that range, unless otherwise indicated herein, and each separate value within such range is incorporated into the specification as if it were individually recited herein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

To the extent that the present disclosure has utilized the term "invention" in various titles or sections of this specification, or in the context of those sections, this term has been included as required by the formatting requirements of word document submissions (i.e., docx submissions) pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A method of creating a glove surface treatment on a glove, comprising:

applying a former on a forming material, wherein the forming material is non-cured and the former includes a plurality of extensions;

creating a first surface treatment on the forming material by the plurality of extensions of the former;

applying a mold material on the forming material, wherein the forming material is cured;

creating a second surface treatment on the mold material, wherein the second surface treatment is an inverse configuration of the first surface treatment;

engaging at least one portion of the mold material having the second surface treatment onto a master mold;

creating a caster mold from the master mold that includes the second surface treatment; and creating the glove surface treatment on the glove by the caster mold.

2. The method of claim 1, wherein each extension of the plurality of extensions defines a curvilinear shape.

3. The method of claim 1, wherein each extension of the plurality of extensions is a ball bearing.

4. The method of claim 1, wherein the step of creating the first surface treatment on the forming material further includes that the first surface treatment is a negative surface; and wherein the step of creating the second surface treatment on the mold material further includes that the second surface treatment is a positive surface.

5. The method of claim 1, wherein the step of creating the first surface treatment on the forming material further includes that the first surface treatment is a plurality of concave surfaces; and wherein the step of creating the second surface treatment on the mold material further includes that the second surface treatment is a plurality of convex surfaces.

6. The method of claim 1, wherein the step of creating the first surface treatment on the forming material further comprises:

applying a first group of extensions of the plurality of extensions on the forming material, wherein each extension of the first group of extensions defines a first diameter; and applying a second group of extensions of the plurality of extensions on the forming material, wherein each extension of the second group of extensions defines a second diameter that is greater than the first diameter of each extension of the first group of extensions.

7. The method of claim 6, wherein the step of applying the first group of extensions of the plurality of extensions on the forming material further includes that the first diameter of each extension of the first group of extensions is between 0.7 mm to 0.8 mm; and wherein the step of applying the second group of extensions of the plurality of extensions on the forming material further includes that the second diameter of each extension of the second group of extensions is between 1.0 mm to 1.2 mm.

8. The method of claim 1, wherein the step of creating the first surface treatment on the forming material further comprises:

applying a first group of extensions of the plurality of extensions on the forming material, wherein each extension of the first group of extensions defines a first diameter;

applying a second group of extensions of the plurality of extensions on the forming material, wherein each extension of the second group of extensions defines a second diameter that is greater than the first diameter of each extension of the first group of extensions; and applying a third group of extensions of the plurality of extensions on the forming material, wherein each extension of the third group of extensions defines a third diameter that is greater than the second diameter of each extension of the second group of extensions.

9. The method of claim 8, wherein the step of applying the first group of extensions of the plurality of extensions on the forming material further includes that the first diameter of each extension of the first group of extensions is between 0.7 mm to 0.8 mm;

wherein the step of applying the second group of extensions of the plurality of extensions on the forming material further includes that the second diameter of each extension of the second group of extensions is between 1.0 mm to 1.2 mm; and wherein the step of applying the third group of extensions of the plurality of extensions on the forming material further includes that the third diameter of each extension of the third group of extensions is between 1.3 mm to 1.4 mm.

10. The method of claim 1, wherein the step of engaging the at least one portion of the mold material having the second surface treatment further comprises:

engaging the at least one portion of the mold material having the second surface treatment to a palm of the master mold.

11. The method of claim 1, wherein the step of engaging the at least one portion of the mold material having the second surface treatment further comprises:

engaging the at least one portion of the mold material having the second surface treatment to at least one digit of the master mold.

12. The method of claim 1, wherein the step of engaging the at least one portion of the mold material having the second surface treatment further comprises:

engaging a first portion of the mold material having the second surface treatment to a palm of the master mold; and engaging a second portion of the mold material having the second surface treatment to at least one digit of the master mold.

13. The method of claim 11, wherein the glove surface treatment includes a first plurality of projections where each projection of the first plurality of projection defines a first diameter; and wherein the glove surface treatment includes a second plurality of projections where each projection of the second plurality of projections defines a second diameter that is equal to the first diameter.

14. The method of claim 11, wherein the glove surface treatment includes a first plurality of projections where each projection of the first plurality of projection defines a first diameter; and wherein the glove surface treatment includes a second plurality of projections where each projection of the second plurality of projections defines a second diameter that is one of greater than or less than the first diameter.

* * * * *